United States Patent
Wu et al.

(10) Patent No.: US 11,132,512 B2
(45) Date of Patent: Sep. 28, 2021

(54) MULTI-PERSPECTIVE, MULTI-TASK NEURAL NETWORK MODEL FOR MATCHING TEXT TO PROGRAM CODE

(71) Applicants: International Business Machines Corporation, Armonk, NY (US); The Board of Trustees of the University of Illinois, Urbana, IL (US)

(72) Inventors: Lingfei Wu, Elmsford, NY (US); Jinjun Xiong, Goldens Bridge, NY (US); Julia Constanze Hockenmaier, Urbana, IL (US); Rajarshi Haldar, Champaign, IL (US)

(73) Assignees: INTERNATIONAL BUSINESS MACHINES CORPORATION, Armonk, NY (US); The Board of Trustees of the University of Illinois, Urbana, IL (US)

( * ) Notice: Subject to any disclaimer, the term of this patent is extended or adjusted under 35 U.S.C. 154(b) by 136 days.

(21) Appl. No.: 16/678,341

(22) Filed: Nov. 8, 2019

(65) Prior Publication Data
US 2021/0141863 A1 May 13, 2021

(51) Int. Cl.
*G06F 40/30* (2020.01)
*G06F 16/2452* (2019.01)
(Continued)

(52) U.S. Cl.
CPC ........ *G06F 40/30* (2020.01); *G06F 16/24522* (2019.01); *G06N 3/04* (2013.01); *G06N 3/08* (2013.01)

(58) Field of Classification Search
CPC ..... G06F 40/30; G06F 16/24522; G06N 3/04; G06N 3/08
See application file for complete search history.

(56) References Cited

U.S. PATENT DOCUMENTS

| | | | |
|---|---|---|---|
| 9,772,823 B2 | 9/2017 | Allen et al. | |
| 10,761,839 B1* | 9/2020 | Migoya | G06F 16/2228 |

(Continued)

FOREIGN PATENT DOCUMENTS

CN 107943514 A 4/2018

OTHER PUBLICATIONS

Garcia-Contreras et al., "Semantic Code Browsing," arXiv preprint arXiv:1608.02565, 2016, 22 pages.
(Continued)

*Primary Examiner* — Kevin Ky
(74) *Attorney, Agent, or Firm* — Cantor Colburn, LLP; Joseph Petrokaitis

(57) ABSTRACT

Embodiments of the invention describe a computer-implemented method that includes receiving a query that includes a query sequence having query characters grouped into query words. A segment of program code is retrieved from a database for evaluation. The program code includes a program code sequence including program code characters grouped into program code words. The query sequence, the query word, the program code sequence, and the program code word are each converted to sequence and word representations. Query sequence-level features, query word-level features, program code sequence-level features, and program code word-level features are extracted from the sequence and word representation. Similarity between the query and the segment of program code is determined by applying a similarity metric technique to the query sequence-level features, the query word-level features, the program code sequence-level features, and the program code word-level features.

20 Claims, 19 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 10,832,668 | B1* | 11/2020 | Devries | G10L 15/183 |
| 10,970,660 | B1* | 4/2021 | Harris | G06Q 10/0637 |
| 11,003,568 | B2* | 5/2021 | Smith | G06F 11/0775 |
| 2017/0132288 | A1* | 5/2017 | Ho | G06F 40/30 |
| 2019/0102374 | A1* | 4/2019 | Tiwari | G06Q 50/01 |
| 2020/0012811 | A1* | 1/2020 | Walters | G06N 3/04 |
| 2020/0034426 | A1* | 1/2020 | Sun | G06F 40/289 |
| 2020/0311344 | A1* | 10/2020 | Tripathi | G06F 40/284 |
| 2020/0320092 | A1* | 10/2020 | Malak | G06F 16/24528 |
| 2021/0004670 | A1* | 1/2021 | Tripathi | G06K 9/00463 |
| 2021/0097976 | A1* | 4/2021 | Chicote | G06F 40/30 |
| 2021/0117458 | A1* | 4/2021 | Higashinaka | G06F 16/3344 |
| 2021/0117617 | A1* | 4/2021 | Blaya | G06F 40/253 |

OTHER PUBLICATIONS

Gu et al., "Deep Code Search," 2018 ACM/IEEE 40th International Conference on Software Engineering (ICSE), IEEE, 2018, pp. 933-944.
Kim et al., "FaCoY: A Code-to-Code Search Engine," Proceedings of the 40th International Conference on Software Engineering, ACM, 2018, 12 pages.
Nguyen et al., "Complementing Global and Local Contexts in Representing API Descriptions to Improve API Retrieval Tasks," Proceedings of the 2018 26th ACM Joint Meeting on European Software Engineering Conference and Symposium on the Foundations of Software Engineering, ACM, 2018, pp. 551-562.
Sachdev et al., "Retrieval on Source Code: A Neural Code Search," Proceedings of the 2nd ACM SIGPLAN International Workshop on Machine Learning and Programming Languages, ACM, 2018, 11 pages.
Sinai et al., "Code Similarity via Natural Language Descriptions," Presentation, Technion—Israel Institute of Technology, POPL Off the Beaten Track, Jan. 2015, 39 pages.
Wang et al., "Bilateral Multi-Perspective Matching for Natural Language Sentences," Proceedings of the 26th International Joint Conference on Artificial Intelligence, AAAI Press, 2017, pp. 4144-4150.

* cited by examiner

Equation (1)    $sim(C, D) = cosine(v_C, v_d)$

Equation (2)    $m = f_m(v_1, v_2; W)w$

Equation (3)    $m_k = cosine(W_k \circ v_1, W_k \circ v_2)$

Equation (4)    $L(\theta) = \sum_{(C, D^+, D^-)} max(0, \varepsilon - cos(c, d^+) + cos(c, d^-))$

FIG. 10

Code/Description Pairs
1100

| Code Snippet | English Description |
|---|---|
| `sum(d * 10** i for i, d in enumerate(x[::-1]))` | Concatenate elements of a list 'x' of multiple integers to a single integer |
| `np.where((vals == (0,1)).all(axis=1))` | find rows matching '(0,1)' in a 2 dimensional numpy array 'vals' |
| `txt = open('file.txt').read()` | read the contents of the 'file.txt' into 'txt' |
| `for i in range(0, 10, 2):pass` | loop through 0 to 10 with step 2 |

FIG. 11

Table 1

| Frameworks | Without Pre-processing | | | | With Preprocessing (Code and Text) | | | |
|---|---|---|---|---|---|---|---|---|
| | Accuracy | Precision | Recall | F-1 | Accuracy | Precision | Recall | F-1 |
| CT | 0.840 | 0.842 | 0.835 | 0.838 | 0.858 | 0.851 | 0.872 | 0.861 |
| CAT | 0.885 | 0.881 | 0.891 | 0.886 | 0.890 | 0.891 | 0.885 | 0.888 |
| BiMPM | 0.754 | 0.717 | 0.839 | 0.773 | 0.865 | 0.847 | 0.894 | 0.870 |
| BiMPM-C | 0.837 | 0.898 | 0.768 | 0.828 | 0.914 | 0.921 | 0.904 | 0.912 |
| MPCTM | 0.911 | 0.932 | 0.905 | 0.910 | 0.919 | 0.937 | 0.899 | 0.918 |
| MPCTM-MT | 0.908 | 0.911 | 0.890 | 0.908 | 0.921 | 0.917 | 0.927 | 0.922 |

Table 2

| Frameworks | MRR | R@1 | R@5 | R@10 |
|---|---|---|---|---|
| CT | 0.322 | 0.206 | 0.432 | 0.536 |
| CAT | 0.586 | 0.391 | 0.876 | 0.961 |
| BiMPM | 0.547 | 0.348 | 0.842 | 0.964 |
| BiMPM-C | 0.581 | 0.385 | 0.853 | 0.954 |
| MPCTM | 0.582 | 0.393 | 0.846 | 0.950 |
| MPCTM-MT | 0.587 | 0.397 | 0.857 | 0.955 |

FIG. 12A

Returned Results A

1. os.chdir('./chapter3')
2. os.path.basename(os.path.normpath('/folderA/'))
3. os.chdir("C:/Users/Name/Desktop")
4. imp.find_module('os')[1]
5. open('test', 'a+b').write('koko')

Returned Results B

1. int("".join(c for c in s if c.isdigit()))
2. sentence.replace(' ', '')
3. re.search('is', String).start()
4. "".join(dropwhile(lambda x : x in bad_chars, example_line[::-1]))[::-1]
5. re.findall('-(?!aa---bb-)([^-]+)', string

Returned Results C

1. ['it'] + ['was'] + ['annoying']
2. sum(1 for _ in it)
3. [[] for i in range(3)]
4. print(" ".join(a) for a in combinations(['hel', 'lo', 'bye'], 2))
5. [x for x in L if x is not None]

FIG. 12B

MULTI-PERSPECTIVE, MULTI-TASK NEURAL NETWORK MODEL FOR MATCHING TEXT TO PROGRAM CODE

BACKGROUND

The present invention relates generally to programmable computer systems. More specifically, the present invention relates to programmable computer systems that implement a novel multi-perspective, multi-task neural network model trained to determine a level of similarity between natural language text and computer program code, and vice versa. The multi-perspective aspects of the model can evaluate global or sequence-level interactions between code and text, as well as local or word-level interactions between code and text. The multi-task aspects of the model can train different sub-models for different, related tasks in such a way that the sub-models share parameters or weights.

Natural language processing (NLP) is a field of computer science concerned with developing algorithms and computer systems for the processing of human languages such as English. One application of NLP is natural language interfaces to data repositories, including repositories of computer code. NLP systems have been developed to perform a variety of text-searching and text-matching tasks at the interface between NLP and software engineering, including tasks such as code summarization, code generation, code retrieval, and code-text matching.

SUMMARY

Embodiments of the invention provide a computer-implemented method of implementing a neural network model trained to execute a first task that includes determining a level of similarity between a first text segment and a second text segment. A non-limiting example of the computer-implemented method includes receiving, using a processor, a query that includes the first text segment, wherein the first text segment includes a first text segment (FTS) sequence that includes at least one FTS character grouped into at least one FTS word. Based at least in part on receiving the first text segment, the second text segment is retrieved from a database, wherein the second text segment includes a second text segment (STS) sequence including at least one STS character grouped into at least one STS word. The FTS sequence is converted to a FTS sequence representation, the at least one FTS word is converted to at least one FTS word representation, the STS sequence is converted to a STS sequence representation, and the at least one STS word is converted to at least one STS word representation. FTS sequence-level features are extracted from the FTS sequence representation, FTS word-level features are extracted from the at least one FTS word representation, STS sequence-level features are extracted from the STS sequence representation, and STS word-level features are extracted from the at least one STS word representation. The computer-implemented method determines, using the processor, the level of similarity between the first text segment and the second text segment by applying a similarity metric technique to the FTS sequence-level features, the FTS word-level features, the STS sequence-level features, and the STS word-level features.

Embodiments of the invention are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 10 depicts equations used in accordance with aspects of the invention;

FIG. 11 depicts a table illustrating code/description pairs used in an experimental implementation of embodiments of the invention;

FIG. 12A depicts tables that summarize the results achieved using experimental implementations of embodiments of the invention;

FIG. 12B depicts results returned using experimental implementations of embodiments of the invention.

Figure 1:
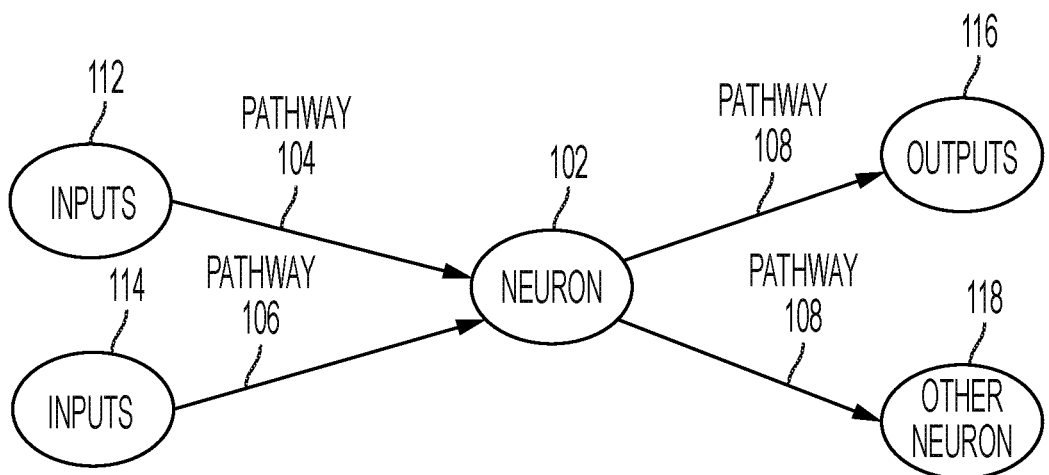
FIG. 1 depicts a simplified diagram of input and output connections of a biological neuron, which is a template for a deep-learning neural network architecture capable of implementing aspects of the invention.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. A modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

Turning now to a more detailed description of technologies related to aspects of the invention, computers can be used to evaluate the relationship between a first text segment and a second text segment. For example, matching a piece or segment of code (i.e., a first text segment) to its corresponding piece or segment of natural language text (i.e., a second text segment), and vice versa, is a fundamental function of a natural language search system configured to interface user queries to a software and/or text repository. One example of such a code segment is known generally as a code "snippet." Code snippets are small, pieces of re-usable source code or machine code that can be integrated into a larger codebase. Code snippets generally have certain functions that operate in a larger and more complicated program. In general, the terms "natural language" refer to language that has been developed by humans over time as a method of communicating between people, rather than language that has been created for communication between non-human entities such as computers.

As previously noted herein, NLP systems can perform a variety of text-searching and text-matching tasks at the interface between NLP and software engineering. Such tasks include, for example, code summarization, code generation, code retrieval, and code-text matching. In code summarization, or code-to-language translation, source code is mapped to a natural language summary or description of that code. In code generation, or language-to-code-translation, natural language instructions are translated to code snippets that perform the task specified by the input instructions. In code retrieval, a user provides a natural language query, and the system returns a ranked list of relevant snippets from a code database or repository. Code-text matching is a binary classification task, wherein the system determines that a segment of program code is described by a segment of natural language text. Among the challenges in performing the above-described searching and matching tasks in NLP systems is enabling computers to translate natural language inputs into a meaningful representation for further processing, as well as enabling computers to effectively and efficiently generate meaningful and useful natural language outputs. The searching and matching tasks are even more challenging when the natural language inputs and/or outputs are in the form of computer program code, and when natural language inputs (or outputs) need to be mapped to computer code outputs (or inputs).

Turning now to an overview of aspects of the present invention, embodiments of the invention provide computer-implemented methods, computer systems and computer program products configured and arranged to evaluate and determine the relationship between a first text segment and a second text segment. More specifically, embodiments of the invention provide a programmable computer system having a novel classification/similarity algorithm that implements a novel multi-perspective, multi-task neural network model trained to determine a level of similarity between a segment of natural language text and a segment of computer program code, and vice versa. The multi-perspective aspects of the model can evaluate global (or sequence-level) interactions between code and text, as well as local (or word-level) interactions between code and text. The multi-task aspects of the model can train different sub-models for different, related tasks in such a way that the sub-models share parameters. In accordance with aspects of the invention, these parameters are the sets of weights that determine the connection strengths between pairs of nodes in the multi-perspective, multi-task model of the classification/similarity algorithm (or neural network). Two models that share parts of their architecture (e.g. a subset of layers) have shared parameters if they use the same sets of weights for some or all of the layers in the shared architecture. The different, related tasks can include matching code and text; translating from code to text; translating from text to code; and the like.

In aspects of the invention, the first text segment can be a segment of program code (C), and the second text segment can be a segment of descriptive natural language text (D). In embodiments of the invention, the above-described novel classification/similarity algorithm is further configured to evaluate and determine the C/D relationship. In some embodiments of the invention, the C/D relationship that is evaluated and determined is the level of semantic similarity between C and D. In some embodiments of the invention, the C/D relationship that is evaluated and determined is the likelihood that D describes C. In some embodiments of the invention, the C/D relationship that is evaluated and determined is the likelihood that C is described by D. In some embodiments of the invention, the novel classification/similarity algorithm can be configured to evaluate and determine the C/D relationship by applying a similarity technique (e.g., computing similarities) with confidence levels (CLs) to C and D.

In embodiments of the invention, the novel classification/similarity algorithm translates C and D into representations that can be recognized and manipulated by the model of the neural network. In aspects of the invention, the representations can be numerical data such as tokens, vectors, and the like. C and D are each a sequence of individual characters, and the sequence of individual characters includes sub-sequences of characters that, taken together, can convey useful semantic meaning. A token is an instance of one or more characters in the sequence that are grouped together in a sub-sequence or a single "word." A "type" is the class of all tokens containing the same character sequence. "Tokenization" is taking C or D and breaking it into its individual words. These tokens are then used as the inputs for other types of downstream neural network analysis or tasks such as pre-processing, vectorization, word embeddings, and feature extraction.

In embodiments of the invention, tokenized C and D can be pre-processed using sub-word regularization techniques. In a suitable sub-word regularization technique, smaller components of words are identified, and these smaller components serve as elementary inputs to the neural network. Because the identified smaller components typically occur with higher frequency in the training data than complete words, sub-word regularization techniques reduce the number of elementary inputs to the neural network, thereby reducing the volume of training data.

Neural network models take vectors (i.e., an array of numbers) as inputs. Token/word vectorization refers to techniques that extract information from a text corpus and associate to each word of the text corpus a vector. For example, the word "king" can be associated with the vector (1, 4, −3, 2). This value can be computed using a suitable vectorization algorithm that takes into account the word's context.

Word embeddings are a way to use an efficient, dense vector-based representation in which similar words have a similar encoding. In general, an embedding is a dense vector of floating point values. An embedding is an improvement over the more traditional bag-of-word model encoding schemes where large sparse vectors are used to represent each word or to score each word within a vector to represent an entire vocabulary. Such representations are considered to be sparse because the vocabularies can be vast, and a given word or document would be represented by a large vector having mostly zero token values. Instead, in an embedding, words are represented by dense vectors where a vector represents the projection of the word into a continuous vector space. The length of the vector is a parameter that must be specified. However, the values of the embeddings are trainable parameters (i.e., weights learned by the model during training in the same way a model learns weights for a dense layer). More specifically, the position of a word within the vector space of an embedding is learned from text and is based on the words that surround the word when it is used. The position of a word in the learned vector space of the word embedding is referred to as its embedding. Small datasets can have word embeddings that are as small as 8-dimensional, while larger datasets can have word embeddings as large as 1024-dimensions. A higher dimensional embedding can capture fine-grained relationships between words but takes more data to learn.

Figure 3A:
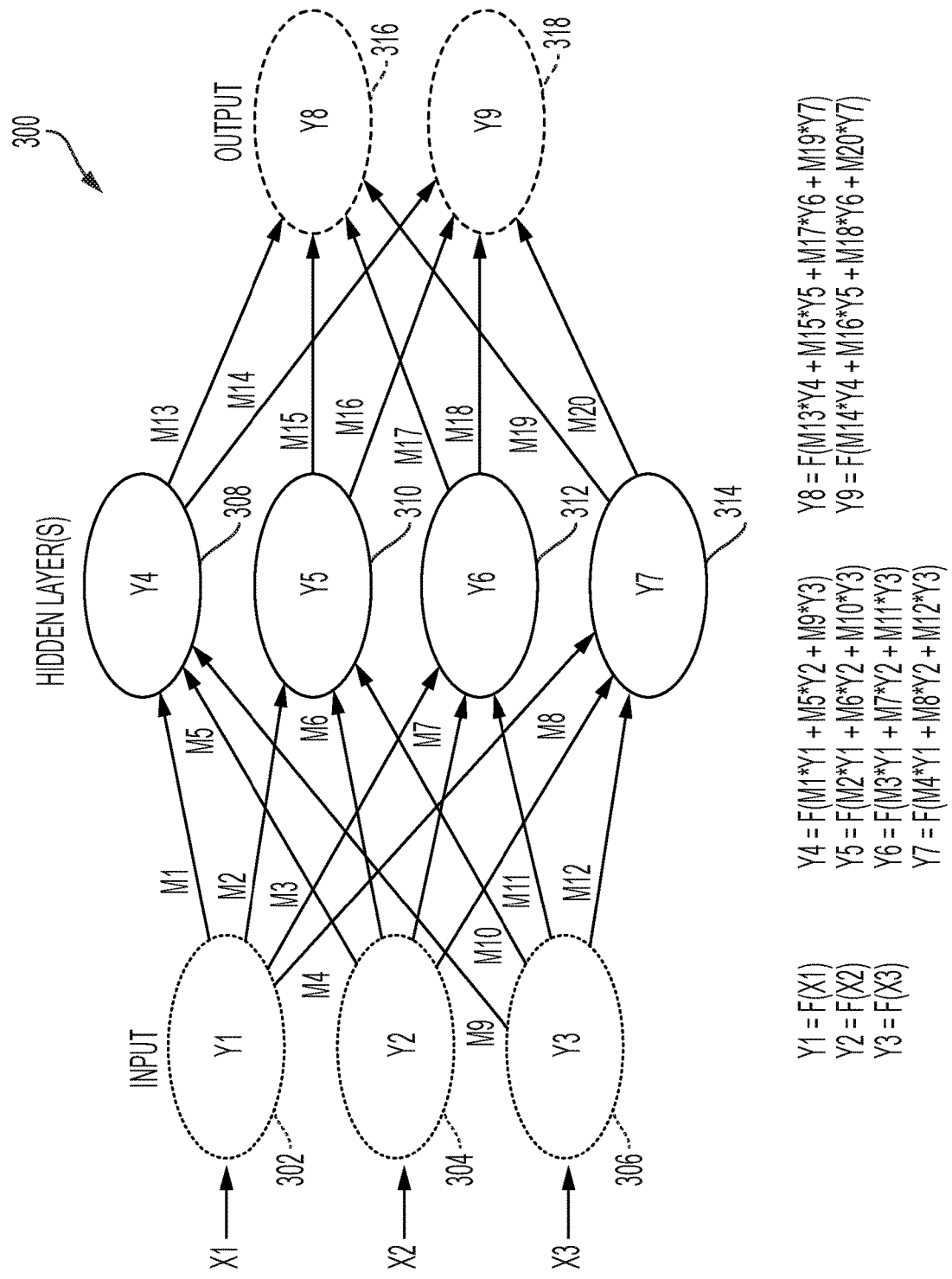
FIG. 3A depicts a simplified diagram illustrating a neural network layer architecture that incorporates the mathematical model shown in FIG. 2 and is a basic neural network framework capable of implementing aspects of the invention.
Figure 3B:
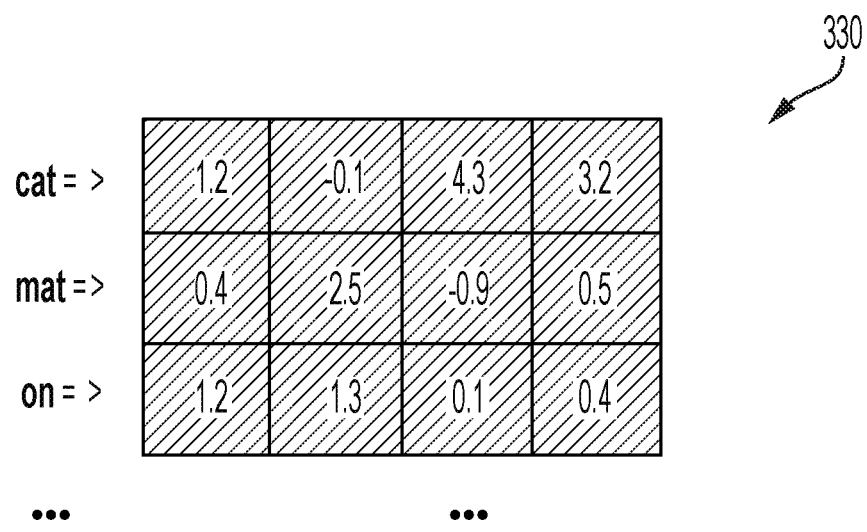
FIG. 3B depicts a diagram of an example word embedding in accordance with aspects of the invention.

FIG. 3B depicts an example diagram of a word embedding 330. As shown in FIG. 3B, each word is represented as a 4-dimensional vector of floating point values. Another way to think of the word embedding 330 is as "lookup table." After the weights have been learned, each word can be encoded by looking up the dense vector it corresponds to in the table. The Embedding layer (or lookup table) maps from integer indices (which stand for specific words) to dense vectors (their embeddings). The dimensionality (or width) of the embedding is a parameter that can be selected to match the task for which it is designed. When an embedding layer is created, the weights for the embeddings are randomly initialized (just like any other layer). During training, the weights are gradually adjusted via backpropagation. Once trained, the learned word embeddings will roughly encode similarities between words (as they were learned for the specific problem on which the model is trained).

Feature extraction techniques are used to reduce the number of resources required to describe a large set of data. Performing analysis of complex data can increase in difficulty as the number of variables involved increases. Analyzing a large number of variables generally requires a large amount of memory and computation power. Additionally, having a large number of variables can also cause a classification algorithm to over-fit to training samples and generalize poorly to new samples. Feature extraction is a general term for methods of constructing combinations of the variables in order to work around these problems while still describing the data with sufficient accuracy.

The above-described neural network processes (e.g., vectorization, word embeddings, and feature extraction) are applied to the representations to, in effect, "learn" a novel C/D model that represents (or models) the relationship (e.g., semantic similarity) between C and D. When the novel C/D model is sufficiently trained, new C/D pairs can be applied to the novel C/D model to output a variety of determinations about the relationship between C and D, including, for example, the level of semantic similarity between C and D, the likelihood that D describes C, and the likelihood that C is described by D.

In some embodiments of the invention, the novel C/D model can be configured to include one or more input layers, one or more output layers, and multiple hidden layers between the input/output layers. In embodiments of the invention, design of the novel C/D model begins by defining a baseline model. In general, a baseline model is a relatively simple model from which the novel C/D model can be built. The baseline model can also be used as a comparison with the novel C/D model to test the quality of the novel C/D model's results.

In embodiments of the invention, the baseline model of the novel C/D model can be a code-text matching (CTM) model having hidden layers that include a word embedding layer (or layers), a context representation layer (or layers), and a max pooling layer (or layers). These CTM hidden layers receive tokenized C and D and map the C tokens and the D tokens into a joint embedding space. The CTM model contains two sets of the above-described hidden layers—one set for the sequence of C tokens, and the other set for the sequence of D tokens. The CTM model uses a similarity metric technique to determine the level of correlation between the C/D vector pairs output from the CTM hidden layers. In general, there are a variety of similarity metric techniques that can be used to determine the similarity between two things. A similarity score can be developed by quantifying different attributes of data objects then employing different similarity algorithms across those attributes to yield similarity scores between the different data objects. In embodiments of the invention, the similarity metric technique can be a cosine similarity technique configured to compute the cosine similarity of C/D vector pairs output from the CTM hidden layers. Using the baseline CTM model, semantically similar C/D pairs are projected to vectors that are close to each other, thereby generating a global-level similarity evaluation of the C/D pair.

Figure 8:
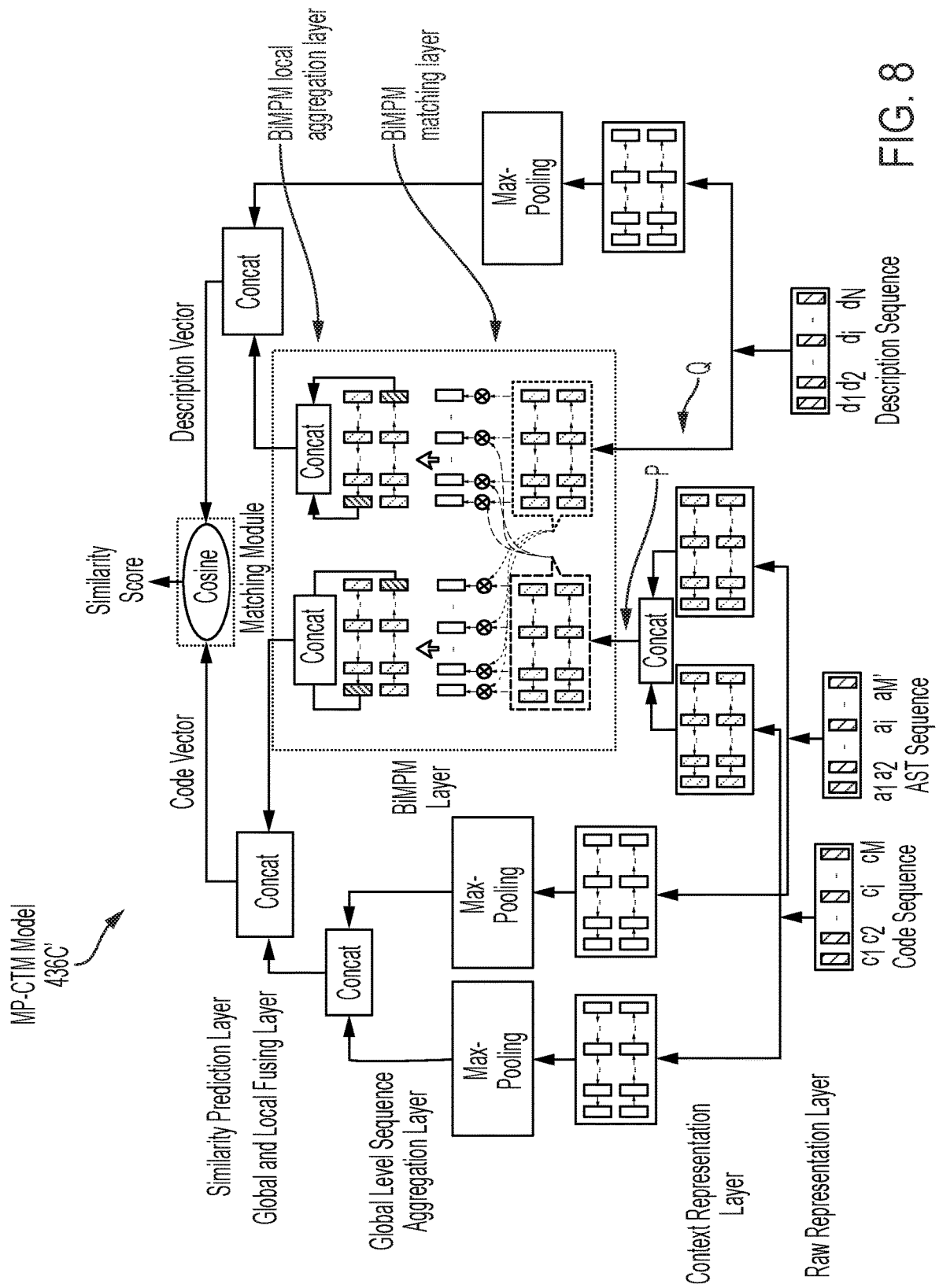
FIG. 8 depicts a block diagram illustrating an example implementation of the multi-perspective code-text matching (MP-CTM) model shown in FIG. 6.

In embodiments of the invention, the baseline CTM model of the novel C/D model can be implemented as a code, abstract syntax tree (AST), and text (CAT) model. In embodiments of the invention, the CAT model uses the same layer architecture as the baseline CTM model, but the CAT model's layer architecture is augmented to include features extracted from an AST representation of C in order to learn syntactic C features in parallel with the semantic C features. The AST representation of C represents the syntactical elements of C in a hierarchical tree structure. The tree of the AST representation focuses on the rules and does not include elements like brackets or semicolons that terminate statements in some languages. The tree is hierarchical, and the elements of programming statements are broken down into their parts. The CAT model's layer architecture is configured to concatenate the semantic C vectors and the syntactic (or AST) C vectors into a single embedding then apply a similarity metric technique (e.g., a cosine similarity technique) to the semantic/AST C vectors and the D vectors. Thus, the CAT model's layer architecture includes the same three hidden layers as the baseline CTM model except the CAT model's layer architecture contains three sets of the three hidden layers, namely, one each for embedding the semantic C sequence, the syntactic C-AST sequence, and the semantic D sequence. Although a variety of suitable known AST techniques can be used to compute the AST representation, aspects of the invention simplify the AST representation using any suitable simplification technique that has been configured to make the AST representation less verbose while still capturing all of the relevant information. In further aspects of the invention, this simplified version of the AST representation is flattened to a string then used along with the raw code (e.g., the code sequence inputs shown in FIG. 8) to create code representations. The features representing both raw code and AST would be stored inside DBE sequence representations (e.g., DBE TS embeddings 564C in FIG. 5B). FIG. 8 depicts code sequence inputs and AST sequence inputs both being fed into the MP-CTM model 436C', as well as depicting embeddings being concatenated to form joint code/AST representations.

In embodiments of the invention, the baseline CTM model of the novel C/D model is further evolved to provide a multi-perspective CTM (MP-CTM) model. In embodiments of the invention, the MP-CTM model uses the same layer architecture as the CAT model (or, optionally, just the baseline CTM model) but also includes a novel bilateral multi-perspective matching (BiMPM) layer. Known approaches to BiMPM use it to compute similarities over pairs of sentences from the same language. In contrast, aspects of the invention apply BiMPM cross-linguistically (e.g., across natural language text and computer program code) to assess similarity of D and C. Additionally, known approaches to BiMPM use it as a binary classification algorithm. In contrast, aspects of the invention take the vectors computed by BiMPM, concatenate them with vectors computed by the CAT model, and compute a cosine similarity of these vectors for C and D. In further contrast to known BiMPM models, aspects of the invention utilize a novel Bi-MPM layer configured to take into account not only high-level features of code and text but also low-level features of semantic code (and, optionally, syntactic (AST) code) and text descriptions. Thus, in addition to the global similarity determined in the baseline CTM model portion of the MP-CTM model, the novel BiMPM layer captures local similarities between C and D. Accordingly, the novel MP-CTM model takes into account not only high-level features of semantic C representations, syntactic (AST) C representations (optionally), and D representations, but also takes into account low-level features of semantic C representations, syntactic (AST) C representations (optionally), and D representations. In embodiments of the invention, the MP-CTM model's hidden layer architecture includes a raw representation layer, a context representation layer, a global-level sequence aggregation layer, the novel BiMPM Layer, a global and local fusing layer, and a final similarity prediction layer.

In some embodiments of the invention, MP-CTM model is further evolved to provide the novel C/D model as an enhanced version of the MP-CTM model configured to utilize a multi-task (MT) learning/training function (or module) that incorporates within the MP-CTM model different functions/modules with shared parameters. The MT learning/training aspects of the enhanced MP-CTM model can train different sub-models for different, related tasks in such a way that the sub-models share parameters. In accordance with aspects of the invention, these shared parameters are the sets of weights that determine the connection strengths between pairs of nodes in a neural network. Two models that share parts of their architecture (e.g. a subset of layers) have shared parameters if they use the same sets of weights for some or all of the layers in the shared architecture. In embodiments of the invention, the different, related tasks can include matching code and text; translating from code to text; translating from text to code; and the like. By using the different modules with shared parameters to focus on different tasks, the enhanced MP-CTM model's layer architecture can be used to learn a more general model that performs better over these individual tasks than if the different frameworks had been shared separately. In embodiments of the invention, the main task is code-text matching, and the different tasks having shared parameters include the main task of matching source code and natural language, along with the related tasks of translating source code to natural language, and the related task of translating natural language to source code. The main task and the related tasks are closely related because they all require the ability to capture whether a piece of natural language describes a piece of code. Incorporating the MT learning/training module results in the enhanced MP-CTM model being a more general model that performs better over the individual tasks.

In aspects of the invention, the novel C/D model's classification/similarity algorithms can be configured to apply confidence levels (CLs) to various ones of their results/determinations (e.g., the previously-described similarity score) in order to improve the overall accuracy of the particular result/determination. When the novel C/D model makes a determination or generates a result (e.g., a similarity score between C and D) for which the value of CL is below a predetermined threshold (TH) (i.e., CL<TH), the result/determination can be classified as having sufficiently low "confidence" to justify a conclusion that the determination/result is not valid. If CL>TH, the determination/result can be considered valid and the determination/result can participate in downstream processing. Many different predetermined TH levels can be provided. The determinations/results with CL>TH can be ranked from the highest CL>TH to the lowest CL>TH in order to prioritize when, how and if the determinations/results are handled in downstream processing.

Accordingly, the above-described embodiments of the novel C/D model improve the ability of computers to determine the relationship between natural language text and computer program code, as well as the ability of computers to effectively and efficiently generate natural language outputs that communicate the nature of the determined relationship (e.g., the likelihood that the natural language text describes the computer program code). In embodiments of the invention, the improved ability of computers to determine the relationship between natural language text and computer program code can be accomplished by providing a multi-task, multi-perspective neural network architecture that captures both global (whole input level) and local (multi-perspective) features of the code and natural language description pair. Additionally, the above-described embodiments of the novel C/D model further improve the ability of computers to determine the relationship between natural language text and computer program code, as well as the ability of computers to effectively and efficiently generate natural language outputs that communicate the nature of the determined relationship (e.g., the likelihood that the natural language text describes the computer program code), by exploiting the related nature of code-text matching, code summarization and code generation to induce representations jointly for all tasks, thereby improving the novel C/D model's performance on matching and code retrieval.

Figure 2:
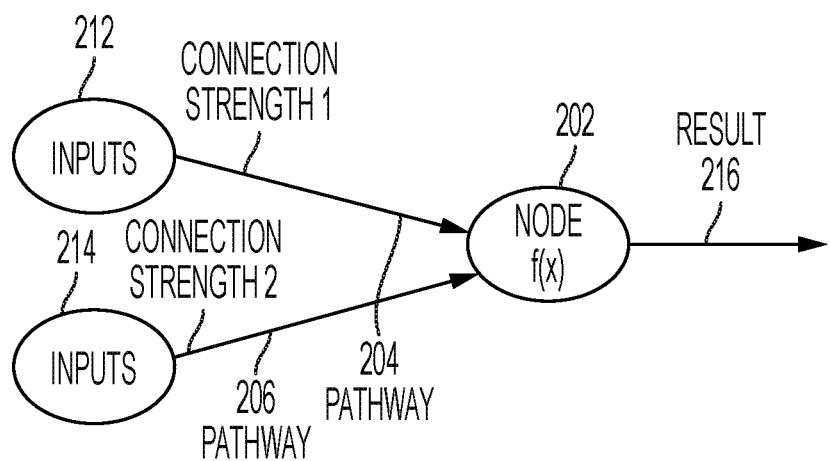
FIG. 2 depicts a simplified diagram illustrating a mathematical model inspired by the simplified biological neuron diagram shown in FIG. 1.

Turning now to a more detailed description of aspects of the invention, FIGS. 1-3A depict various features of a neural network architecture 300 (shown in FIG. 3A) capable of implementing aspects of the invention. More specifically, FIG. 1 depicts a simplified diagram of input and output connections 112, 114, 116, 118 of a biological neuron 102, which provides a template for the neural network architecture 300. A normal adult human brain includes about one hundred billion interconnected neurons. FIG. 2 depicts a simplified model of the biological neuron 102 shown in FIG. 1. FIG. 3A depicts the simplified neural network layer architecture 300 that incorporates the biological neuron model shown in FIG. 2.

Turning to FIG. 1, there is depicted a simplified diagram of the biological neuron 102 having pathways 104, 106, 108, 110 that connect it to upstream the inputs 112, 114, downstream outputs 116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections 104, 106, 108, 110 between the biological neurons 102, 118 can be strong or weak. When the neuron 102 receives input impulses, the neuron 102 processes the input according to the neuron's function and sends the result of the function on pathway 108 to downstream outputs 116 and/or on pathway 110 to downstream "other" neurons 118.

In FIG. 2, biological neuron 102 is modeled as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which may be a final output or an input to another node, or both. In the present specification, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3A depicts a simplified neural network architecture (or model) 300. In general, neural networks can be implemented as a set of algorithms running on a programmable computer (e.g., computer systems 1300, 1300A shown in FIGS. 4A and 11). In some instances, neural networks are implemented on an electronic neuromorphic machine (e.g., the IBM®/DARPA SyNAPSE computer chip) that attempts to create connections between processing elements that are substantially the functional equivalent of the synapse connections between brain neurons. In either implementation, neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical). The basic function of a neural network is to recognize patterns by interpreting unstructured sensory data through a kind of machine perception. Unstructured real-world data in its native form (e.g., images, sound, text, or time series data) is converted to a numerical form (e.g., a vector having magnitude and direction) that can be understood and manipulated by a computer. The neural network performs multiple iterations of learning-based analysis on the real-world data vectors until patterns (or relationships) contained in the real-world data vectors are uncovered and learned.

Although the patterns uncovered/learned by a neural network can be used to perform a variety of tasks, two of the more common tasks are labeling (or classification) of real-world data and determining the similarity between segments of real-world data. Classification tasks often depend on the use of labeled datasets to train the neural network to recognize the correlation between labels and data. This is known as supervised learning. Examples of classification tasks include detecting people/faces in images, recognizing facial expressions (e.g., angry, joyful, etc.) in an image, identifying objects in images (e.g., stop signs, pedestrians, lane markers, etc.), recognizing gestures in video, detecting voices, detecting voices in audio, identifying particular speakers, transcribing speech into text, the like. Similarity tasks apply similarity techniques and (optionally) confidence levels (CLs) to determine a numerical representation of the similarity between a pair of items.

Returning to FIG. 3A, the simplified neural network architecture/model 300 is organized as a weighted directed graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes, and nodes 316, 318 are output layer nodes. Each node is connected to every node in the adjacent layer by connection pathways, which are depicted in FIG. 3A as directional arrows having connection strengths m1 to m20. Although only one input layer, one hidden layer and one output layer are shown, in practice, multiple input layers, multiple hidden layers and multiple output layers can be provided. When multiple hidden layers are provided, the neural network 300 can perform unsupervised deep-learning for executing classification/similarity type tasks.

Similar to the functionality of a human brain, each input layer node 302, 304, 306 of the neural network 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3A. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3A.

The neural network model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of a neural network, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and recurrent networks. The neural network model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

Figure 4:
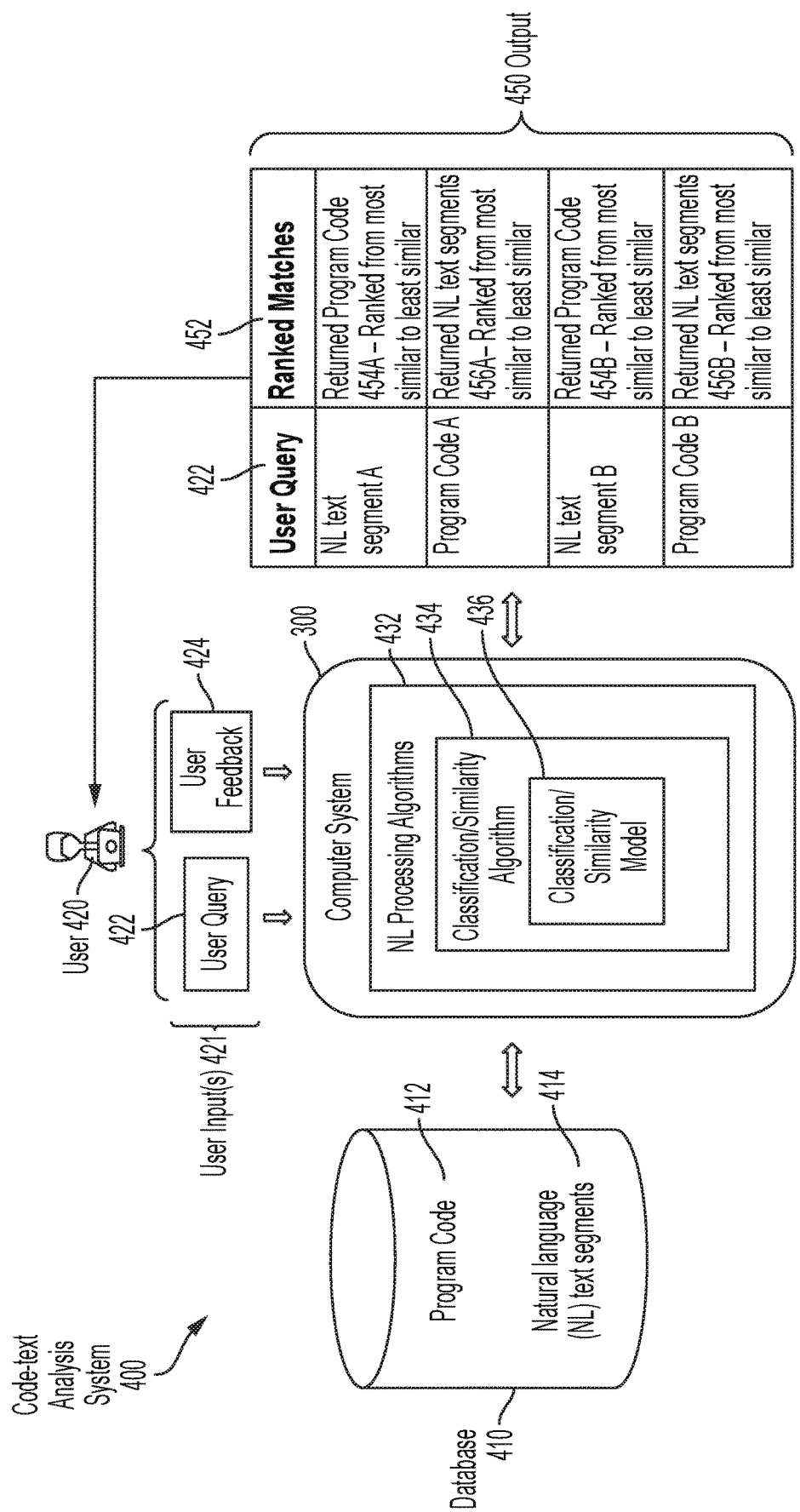
FIG. 4 depicts a block diagram of a computer-based code-text analysis system embodying aspects of the invention.

FIG. 4 depicts a block diagram of a code-text analysis system 400 embodying aspects of the invention. The code-text analysis system 400 includes a computer system 1300 communicatively coupled to a database 410. The database 410 stores or otherwise has access to real-world data that can include program code segments (e.g., code snippets) 412 and natural language text segments 414. The program code 412 and the natural language text segments 414 are shown in a single database 410 for ease of illustration. In some embodiments of the invention, the program code 412 can be stored in a database that is separate from the database that stores the natural language text segments 414. In some embodiments of the invention, the program code 412 can be spread among multiple separate databases, and the natural language text segments 414 can be spread among multiple separate databases. In some embodiments of the invention, the program code 412 and the natural language text segments 414 are stored such that the relationships, if any, between the program code 412 and the natural language text segments is not captured by the structure of the database 410 and/or is not known to the computer system 1300. In embodiments of the invention where the performance of the code-text analysis system 400 is being tested, the relationship between the program code 412 and the natural language text segments 414 are known (e.g., code/descriptions pairs 1100 shown in FIG. 11) and can be used to evaluate the accuracy of the analysis that is performed by the code-text analysis system 400 to uncover or learn the relationships between the program code 412 and the natural language text segments 414.

The computer system 1300 implements a neural network having input layers, hidden layers, output layers, nodes, and weighted connections (e.g., as shown in FIGS. 5A-9) that operate in accordance with the general functionality of the neural network 300 (shown in FIG. 3A) and that further includes natural language processing algorithms 432, novel classification/similarity algorithms 434, and novel classification/similarity models 436 configured and arranged as shown. It is noted that the previously-described novel C/D model is an example implementation of the novel classification/similarity model 436 shown in FIG. 4. In operation, the natural language processing algorithms 432, the novel classification/similarity algorithms 434, and the novel classification/similarity models 436 work together to train/learn the novel classification/similarity model 436 in accordance with aspects of the invention.

In operation, the computer system 1300 receives user inputs 421 from a user 420. In aspects of the invention, the user inputs 421 include a user query 422. In response to receiving the user query 422, the computer system 1300 is configured to access the database 410 to retrieve and analyze program code 412 and/or natural language text segments 414 to determine the program code 412 and/or natural language text segments 414 that are responsive to the user query 422. In aspects of the invention, the user query 422 is about the relationship between the subject of the user query 422 (e.g., a segment of program code snippet or a segment of natural language text) and the program code 412 or the natural language text segments 414 stored in the database 410. In some aspects of the invention, the substance of the user query 422 is to provide feedback on the specific nature of the relationship between the subject of the user query 422 and the program code 412 or the natural language text segments 414 stored in the database 410. For example, in some embodiments of the invention, the substance of the user query 422 is a request to determine how semantically similar a given segment of program code is to the natural language text segments 414 stored in the database 410. In some embodiments of the invention, the substance of the user query 422 is a request to determine the likelihood that a given natural language text segment describes one or more segments of the program code 412 stored in the database 410. In some embodiments of the invention, the substance of the user query 422 is a request to determine the likelihood that a given segment of program code is described by one or more of the natural language text segments 414 stored in the database 410.

In embodiments of the invention where the substance of the user query 422 is a request to determine and rank the level of semantic similarity between a given segment of program code (or a given segment of natural language text) and the natural language text segments 414 (or the program code 412) stored in the database 410, the natural language processing algorithms 432, novel classification/similarity algorithms 434, and novel classification/similarity models 436 work together to analyze the program code 412 and/or the natural language text segments 414 to determine the program code and natural language text segments that are responsive to the user query 422. The analysis performed by the natural language processing algorithms 432, novel classification/similarity algorithms 434, and novel classification/similarity models 436 includes translating the program code 412 and the natural language text segments 414 to numerical data (e.g., tokens, vectors, and the like), optionally pre-processing the tokenized program code and natural language text with sub-word regularization, and applying a series of novel hidden-layer processes to the numerical data that, in effect, "learn" or "train" the novel classification/similarity model 436 so that it represents (or models) the substance of the user query 422, which, in embodiments of the invention, is a determination of the level of semantic similarity between pairs of a given program code and the natural language text segments 414 stored in the database 410, or the level of semantic similarity between pairs of a given natural language text segment and a segment of the program code 412 stored in the database 410. When the improved classification/similarity model 436 is sufficiently trained, new user queries 422 and retrieved program code 412 and/or natural language text segments 414 can be applied to the novel classification/similarity model 436 to determine the level of semantic similarity between the user query 422 and the retrieved program code 412 and the natural language text segments 414. In some aspects of the invention, the new user queries 422 and program code 412 and/or natural language text segments 414 can include the same program code and natural language text segments that were used to train the novel classification/similarity model 436. In some aspects of the invention, the user queries 422 and the retrieved program code 412 and/or natural language text segments 414 can be different from the user queries, program code, and/or natural language text segments that were used to train the novel classification/similarity model 436.

In embodiments of the invention where the substance of the user query 422 is to determine the likelihood that a given natural language text segments describes a segment of the program code 412 stored in the database 410, the same processes described above are used except the novel classification/similarity model 436 is trained to represent (or model) the likelihood that a given one of the natural language text segments describes a segment of the program code 412 stored in the database 410.

In embodiments of the invention where the substance of the user query 422 is to determine the likelihood that a given segment of program code is described by one of the natural language text segments 414 stored in the database 410, the same processes described above are used except the novel classification/similarity model 436 is trained to represent (or model) the likelihood that a given segment of program code is described by one of the natural language text segments 414 stored in the database 410.

The computer system 1300 generates an output 450 in a flexible format and structure that captures the relationship between user queries 422 and either the retrieved program code segments 412 or the natural language text segments 414 that are responsive to the user query 422. The format of the output 450 shown in FIG. 4 is a table that matches the code or text that is the subject (i.e., the known portion) of the user query 422 to a ranked listing of the program code 412 or natural language text segment 414 that is responsive to the substance of the user query 422 (e.g., semantic similarity between program code and natural language text). The specific format and structure of the output 450 is one example, and the code-text analysis system 400 can be programmed to generate the output 450 in other formats and structures that match the specific user query 422 and the specific embodiment of the classification/similarity algorithm 434 (e.g., classification/similarity algorithms 434A, 434B shown in FIG. 6) that are being used.

In embodiments of the invention, the user inputs 421 can also include user training feedback 424 from the user 420. The user training feedback 424 can be generated by the user 420 based on a review by the user 420 of the output 450. In embodiments of the invention, the format of the output 450 can include a user feedback region where the user 420 can electronically enter user feedback about one or more of the code/text pairs in the returned output 450. The computer system 1300 can receive the user training feedback 424 through a user feedback region that can be made part of the format of the output 450. The computer system 1300 can be configured to provide the user training feedback 424 to the classification/similarity algorithms 434, which are configured to use the user training feedback 424 (e.g., through making the appropriate adjustments to the weights used in the classification/similarity model 436) to further train the classification/similarity models 436. In some embodiments of the invention, the output 450 can include an automatically generated dialogue box that is displayed to the user 420 (e.g., through the input/output component 1312 shown in FIG. 13) and is configured to prompt the user 420 to provide the user training feedback 424 in the user feedback region of the output 450. In embodiments of the invention, the user training feedback 424 can identify the code/text pairs returned by the classification/similarity model 436 where the program code and the text in the returned code/text pair are relevant to one another. In embodiments of the invention, the user training feedback 424 can identify the code/text pairs returned by the classification/similarity model 436 where the program code and the text returned in the code/text that are not relevant to one another. In embodiments of the invention, the user training feedback 424 can identify the code/text pairs returned by the classification/similarity model 436 where the program code and the text in the code/text pair are relevant to one another, along with identifying the code/text pairs returned by the classification/similarity model 436 wherein the program code and the text in the code/text pair are not relevant to one another. In some embodiments of the invention, the user training feedback 424 can be provided on a scale, for example, a scale ranging from 1 through to 10, where 10 indicates that the program code and the text in the code/text pair are 100% relevant to one another, and where 1 indicates that the program code and the text in the code text pair are 0% relevant to one another. In aspects of the invention, the user training feedback 424 is only utilized during an initial training of the novel classification/similarity model 436. In aspects of the invention, the user training feedback 424 can be utilized during periodic post-initial-training (or updated) training of the novel classification/similarity model 436.

Figure 5A:
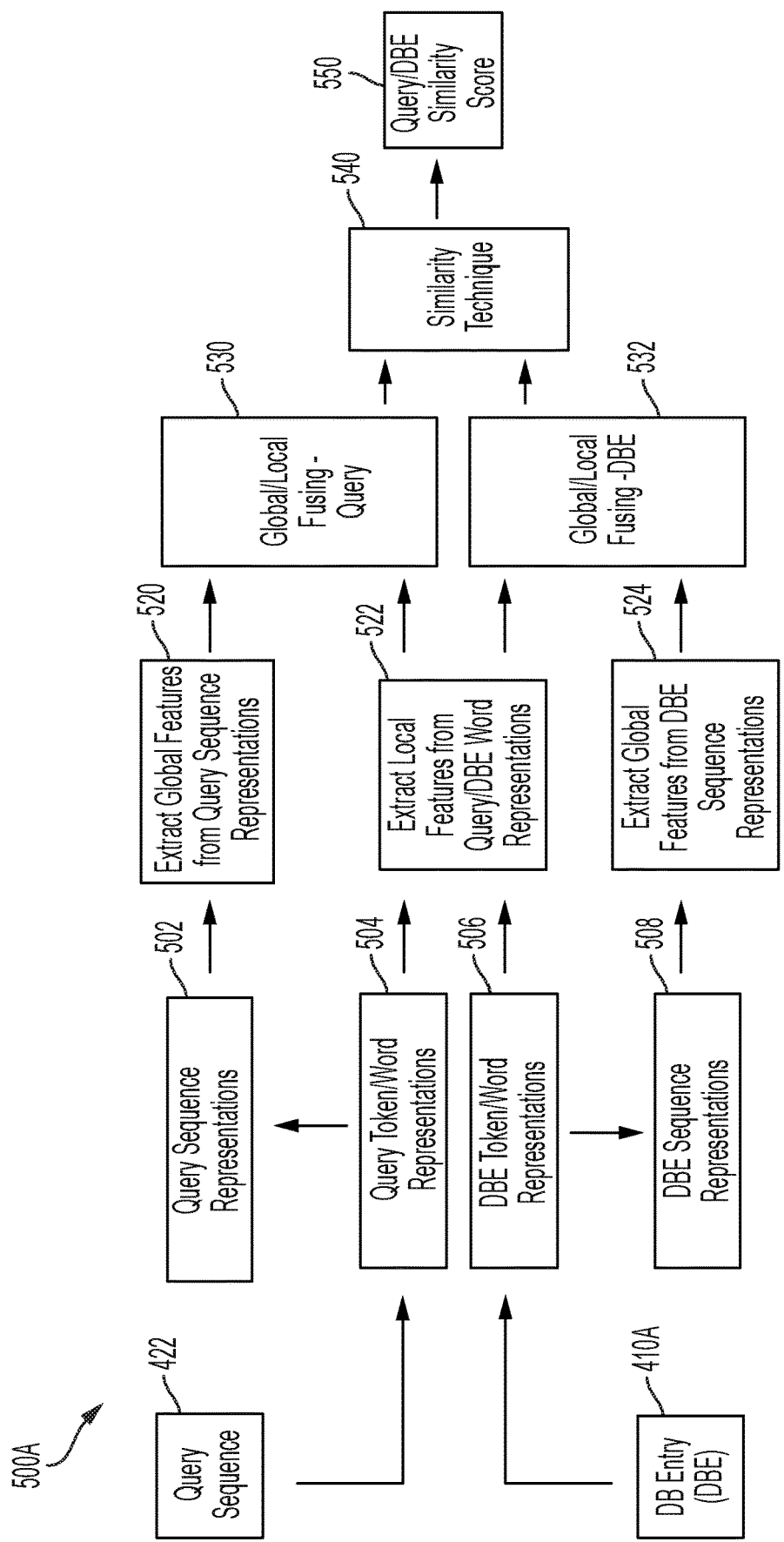
FIG. 5A depicts a flow diagram illustrating a method that can be implemented by the code-text analysis system shown in FIG. 4 in accordance with aspects of the invention.
Figure 5B:
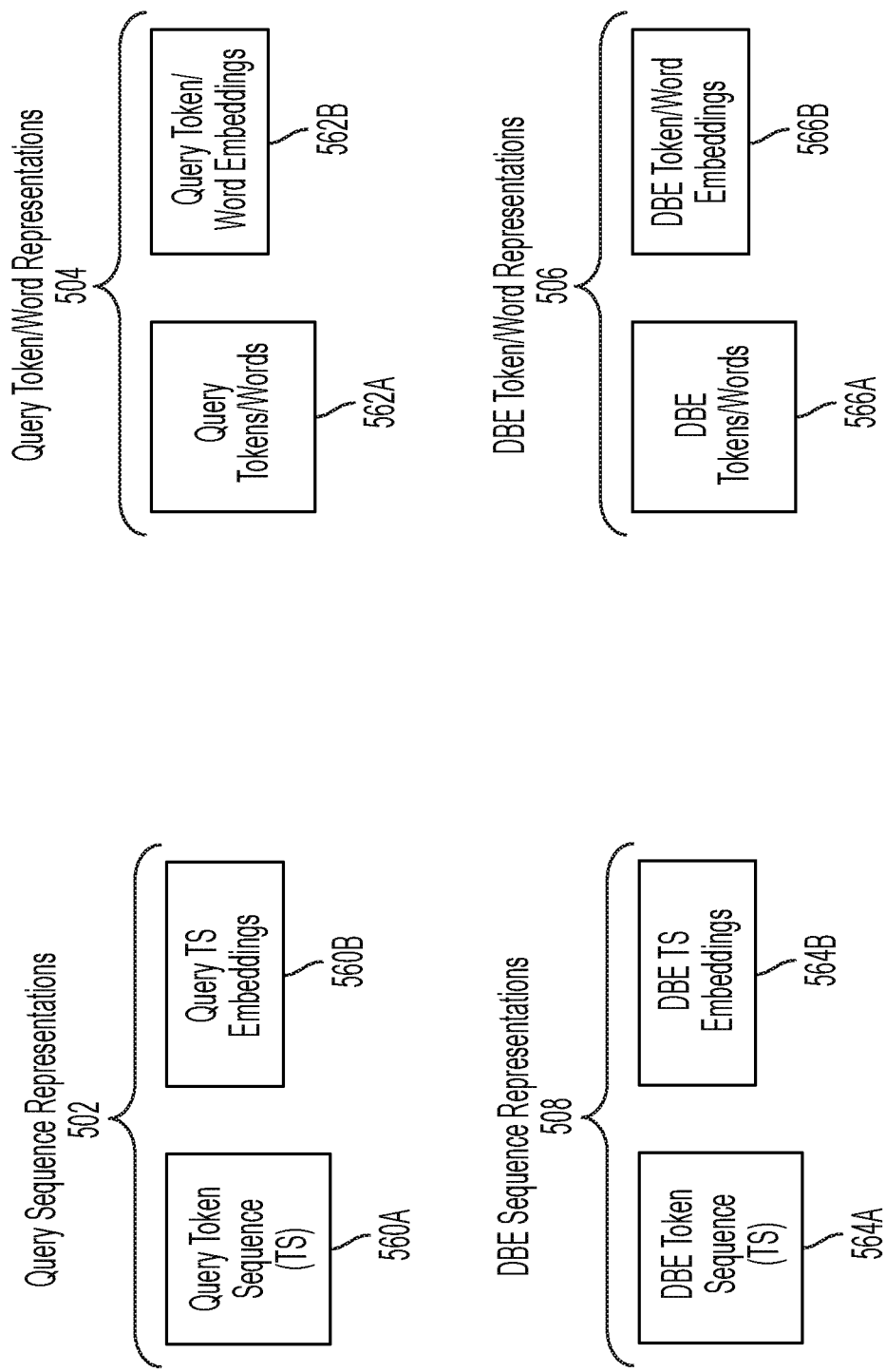
FIG. 5B depicts a diagram illustrating example implementations of the query sequence representations, query token/word representations, database entry (DBE) sequence representations, and DBE token/word representations of the method shown in FIG. 5A.

FIG. 5A depicts a flow diagram illustrating a method 500A that can be implemented using the code-text analysis system 400 (shown in FIG. 4) in accordance with aspect of the invention. The method 500A is an example of the multi-task aspects of the invention that can evaluate global (e.g., sequence-level) interactions between the query 422 and an entry from the database 410, as well as local (e.g., word-level) interactions between the query 422 and an entry from the database 410. The following description of the method 500A includes references to the code-text analysis system 400 that implements the method 500A, along with references to the various representations shown in FIG. 5B. In embodiments of the invention, the method 500A is configured to implement a neural network model (e.g., classification/similarity model 436) that models or represents a level of similarity between a first text segment and a second text segment. In embodiment of the invention, the first text segment is the user query 422, and the second text segment is a database entry (DBE) 410A stored in the database 410. The method 500A proceeds by receiving the user query 422 at the computer system 1300. As noted, the user query 422 includes the first text segment. In some embodiments of the invention, the first text segment can be a segment of program code. In some embodiments of the invention, the first text segment can be a natural language text segment. Based at least in part on receiving the user query 422, the computer system 1400 accesses the DBE 410A stored in the database 410. In aspects of the invention, the method 500A evaluates all of the entries (serially or in batches) in the database 410 so the DBE 410A can be any entry stored in the database 410. As noted, the DBE 410A includes the second text segment. In embodiments of the invention where the first text segment of the user query 422 is a program code segment, the second text segment can be one of the natural language text segments 414 stored in the database 410. In embodiments of the invention where first text segment of the user query 422 is a natural language text segment, the second text segment can be one of the program code segments 412 stored in the database 410.

In embodiments of the invention, the first text segment includes a first text segment (FTS) sequence that includes at least one FTS character grouped into at least one FTS word. In embodiments of the invention, the second text segment includes a second text segment (STS) sequence that includes at least one STS character grouped into at least one STS word.

In embodiments of the invention, at block 502 the method 500A uses the natural language processing algorithms 432 and the classification/similarity algorithms 434 to convert the query/FTS sequence 422 to query/FTS sequence representations. In some aspects of the invention, the query/FTS sequence representations generated at block 502 can be implemented as a query/FTS token sequence (TS) 560A (shown in FIG. 5B) and as query/FTS TS vectors in the form of query/FTS TS embeddings 560B (shown in FIG. 5B).

In embodiments of the invention, at block 504 the method 500A uses the natural language processing algorithms 432 and the classification/similarity algorithms 434 to also convert the query/FTS sequence 422 to query/FTS token/word representations. In some aspects of the invention, the query/FTS token/word representations generated at block 504 can be implemented as query/FTS tokens/words 562A (shown in FIG. 5B) and as query/FTS token/word vectors in the form of query/FTS token/word embeddings 562B (shown in FIG. 5B).

In embodiments of the invention, at block 508 the method 500A uses the natural language processing algorithms 432 and the classification/similarity algorithms 434 to convert the DBE/STS sequence 410A to DBE/STS sequence representations. In some aspects of the invention, the DBE/STS sequence representations generated at block 508 can be implemented as a DBE/STS token sequence (TS) 564A (shown in FIG. 5B) and as DBE/STS TS vectors in the form of DBE/STS TS embeddings 564B (shown in FIG. 5B).

In embodiments of the invention, at block 506 the method 500A uses the natural language processing algorithms 432 and the classification/similarity algorithms 434 to also convert the DBE/STS sequence 410A to DBE/STS token/word representations. In some aspects of the invention, the DBE/STS token/word representations generated at block 506 can be implemented as DBE/STS tokens/words 566A (shown in FIG. 5B) and as DBE/STS token/word vectors in the form of DBE/STS token/word embeddings 566B (shown in FIG. 5B).

In embodiments of the invention, at block 520 the method 500A uses the natural language processing algorithms 432 and the classification/similarity algorithms 434 to extract global features from the query/FTS sequence representations. In embodiments of the invention, at block 522 the method 500A uses the natural language processing algorithms 432 and the classification/similarity algorithms 434 to extract local features from the query/FTS word representations. In embodiments of the invention, at block 522 the method 500A uses the natural language processing algorithms 432 and the classification/similarity algorithms 434 to also extract local features from the DBE/STS word representations. In embodiments of the invention, at block 524 the method 500A uses the natural language processing algorithms 432 and the classification/similarity algorithms 434 to extract global features from the DBE/STS sequence representations.

In embodiments of the invention, at block 530 the method 500A uses the natural language processing algorithms 432 and the classification/similarity algorithms 434 to represent the global features of the query/FTS sequence representations and the local features of the query/FTS word representations as a single vector having global and local features of the query/FTS sequence 422. In embodiments of the invention, at block 532 the method 500A uses the natural language processing algorithms 432 and the classification/similarity algorithms 434 to represent the global features of the DBE/STS sequence representations and the local features of the DBE/STS word representations as a single vector having global and local features of the DBE/STS.

At block 540 of the method 500A, a similarity technique is applied to the single vector output from block 530 and the single vector output from block 540 to determine the level of correlation between the vector pairs output from blocks 530, 532. In general, there are a variety of similarity metric techniques that can be used to determine the similarity between two things. At block 550 a similarity score can be developed by quantifying different attributes of data objects then employing different similarity algorithms across those attributes to yield similarity scores between the different data objects. In embodiments of the invention, the similarity metric technique used at block 540 can be a cosine similarity technique configured to compute the cosine similarity of the vector pairs output from blocks 530, 532. In some embodiments of the invention, the similarity score used at block 550 can be configured to generate its similarity scores with confidence levels (CLs). In embodiments of the invention, block 550 can also generate the output 450 in the previously described format(s).

Figure 5C:
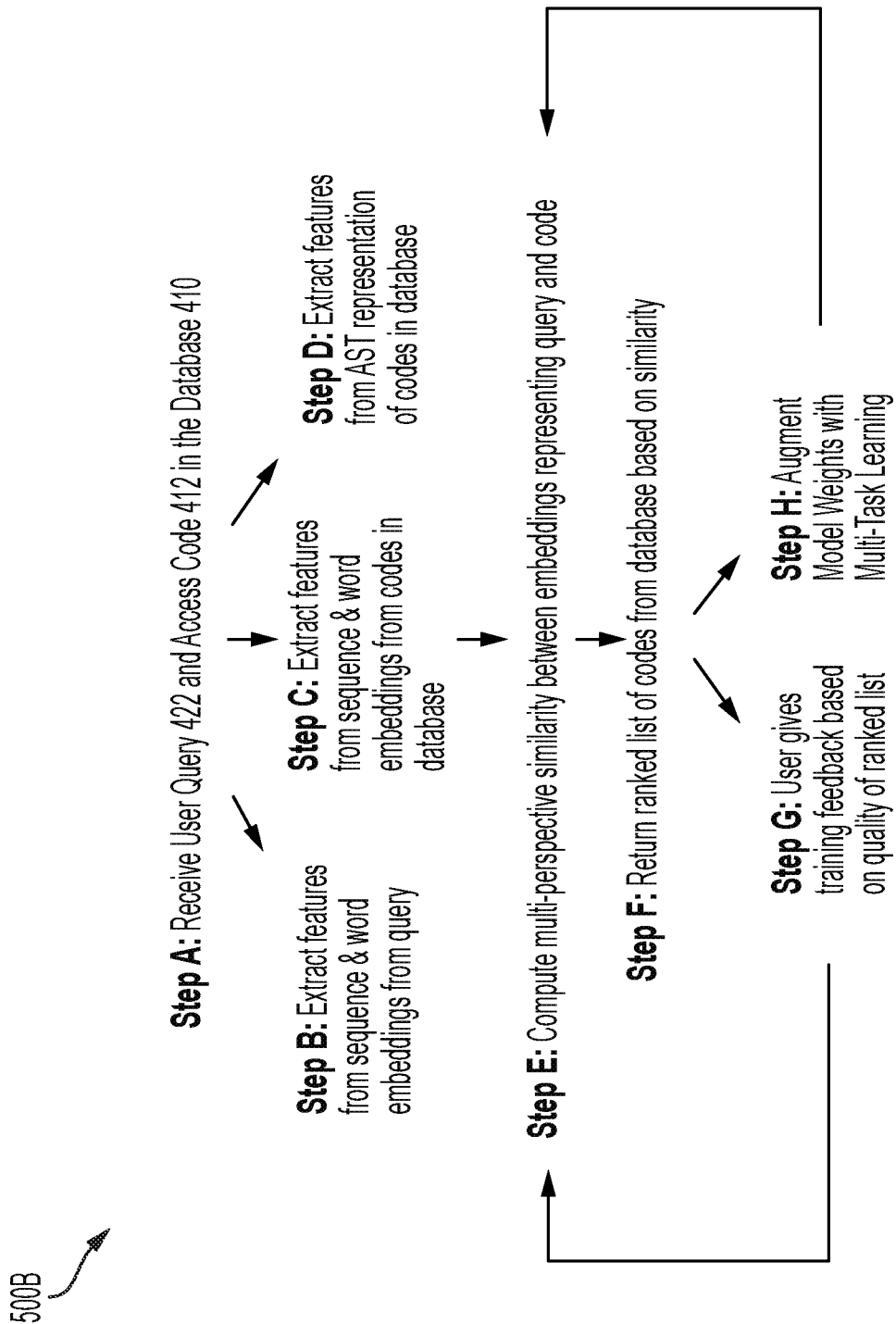
FIG. 5C depicts a flow diagram illustrating a method that can be implemented by the code-text analysis system shown in FIG. 4 in accordance with aspects of the invention.

FIG. 5C depicts a flow diagram illustrating a method 500B that can be implemented using the code-text analysis system 400 (shown in FIG. 4) in accordance with aspect of the invention. The method 500B is an example of the multi-perspective and the multi-task aspects of the invention. The multi-perspective aspects of the method 500B operate in substantially the same way as the multi-perspective aspects of the method 500A (shown in FIG. 5A). The multi-task aspects of the method 500B can train different sub-models of the classification/similarity model 436 (shown in FIG. 4) for different, related tasks in such a way that the sub-models share parameters. In accordance with aspects of the invention, these shared parameters are the sets of weights that determine the connection strengths between pairs of nodes in the multi-perspective, multi-task model (e.g., enhanced MP-CTM model 436D shown in FIG. 6) of the classification/similarity algorithm 436 (or neural network). Two models that share parts of their architecture (e.g. a subset of layers) have shared parameters if they use the same sets of weights for some or all of the layers in the shared architecture. The different, related tasks can include matching code and text; translating from code to text; translating from text to code; and the like. The following description of the method 500B includes references to the code-text analysis system 400 that implements the method 500A, along with references to the various representations shown in FIG. 5B. In embodiments of the invention, the method 500B is configured to implement a neural network model (e.g., classification/similarity model 436) that models or represents a level of similarity between a user query 422 and the entries in the database 410. In the embodiment of the method 500B shown in FIG. 5C, the query 422 is a segment of natural language text, and the entries in the database 410 include segments of program code 412. In some embodiment of the invention, the level of similarity between the user query 422 and the entries in the database 410 is a measure of how well the user query 422 describes the functionality of a segment of program code 412 in the database 410. Although the method 500B is applied to the task of receiving natural language text in the user query 422 and evaluating the entries in the database 410 to determine the entries that match the natural language text, the method 500B could also be applied to the task of receiving program code in the user query 422 and evaluating entries in the database 410 to determine the natural language entries that match the received program code.

As shown in FIG. 5C, STEP A of the method 500B uses the computer system 1300 to receive the user query 422, determine that the user query is a segment of natural language text, and access the program code 412 stored in the database 410. STEPS B, C, and D are performed by the natural language processing algorithms 432 and the classification/similarity algorithms 434 and can proceed serially or in parallel (or in a combination of serial/parallel). In embodiments of the invention, STEP B tokenizes the words and sequence(s) in the user query 422, represents the tokenized user query in word/sequence embedding(s) (i.e., a dense vector representation), and extracts features from the word/sequence embeddings created from the user query 422. In embodiments of the invention, the word/sequence embeddings generated at STEP B can be pre-trained. In embodiments of the invention, STEP C tokenizes the words and sequence(s) in the program code 412 retrieved from the database 410, represents the tokenized program code in word/sequence embedding(s) (i.e., a dense vector representation), and extracts features from the word/sequence embeddings created from the program code 412. In embodiments of the invention, the word/sequence embeddings generated at STEP C can be pre-trained.

In embodiments of the invention, STEP D of the method 500B accesses the tokenized words and sequence(s) in the program code 412, represents the tokenized program code in word/sequence in syntactic representations of the program code words/sequences, and extracts features from the syntactic representations of the program code. In embodiments of the invention, the syntactic representations of the program code can be obtained using an abstract syntax tree (AST). The features extracted from the AST representation of the program code 412 in order to learn both syntactic (STEP D) and semantic (STEP C) program code features in parallel with one another.

In some embodiments of the invention, STEP D of the method 500B can optionally be omitted. In some embodiments of the invention, STEP D of the method 500B can be incorporated into the method 500A shown in FIG. 5A.

In embodiments of the invention, STEP E of the method 500B is configured to concatenate the program code vectors generated at STEPS C & D into a single semantic/syntactic program code vector then apply a similarity metric technique (e.g., a cosine similarity technique) and, optionally, confidence levels, to the single semantic/syntactic program code vector and the query vector generated at STEP B to determine the level of correlation between the user query 422 and the program code segments 412 stored in the database 410. The operations at STEP E are multi-perspective in that they take into account global (i.e., sequence level) interactions between code and natural language text, as well as local (i.e., word or token level) interactions between code and natural language text.

In embodiments of the invention, STEP F of the method 500B uses the computing system 1300 to generate the output 450 in a flexible format and structure that captures the learned relationship between the user query 422 (i.e., natural language text) and the segments of program code 412 stored in the database 410. The specific format and structure of the output 450 shown in FIG. 4 is one example, and the code-text analysis system 400 and the computing system 1300 can be programmed to generate the output 450 in other formats and structures that match the specific embodiment of the user query 422 and the classification/similarity algorithm 434 that are being used.

At STEP G of the method 500B, the computer system 1300 and the classification/similarity model 436 receive user training feedback 424 from the user 420 based on a review by the user 420 of the output 450. In embodiments of the invention, the format of the output 450 can include a user feedback region as previously described herein where the user 420 can electronically enter user feedback on one or more of the code/text pairs returned in the output 450. In aspects of the invention, the user training feedback 424 is only utilized during an initial training of the model 436B. In aspects of the invention, the user training feedback 424 can be utilized during periodic post-initial-training (or updated) training of the model 436B.

In some embodiments of the invention, STEP G of the method 500B shown in FIG. 5C can be incorporated into the method 500A shown in FIG. 5A.

Figure 6:
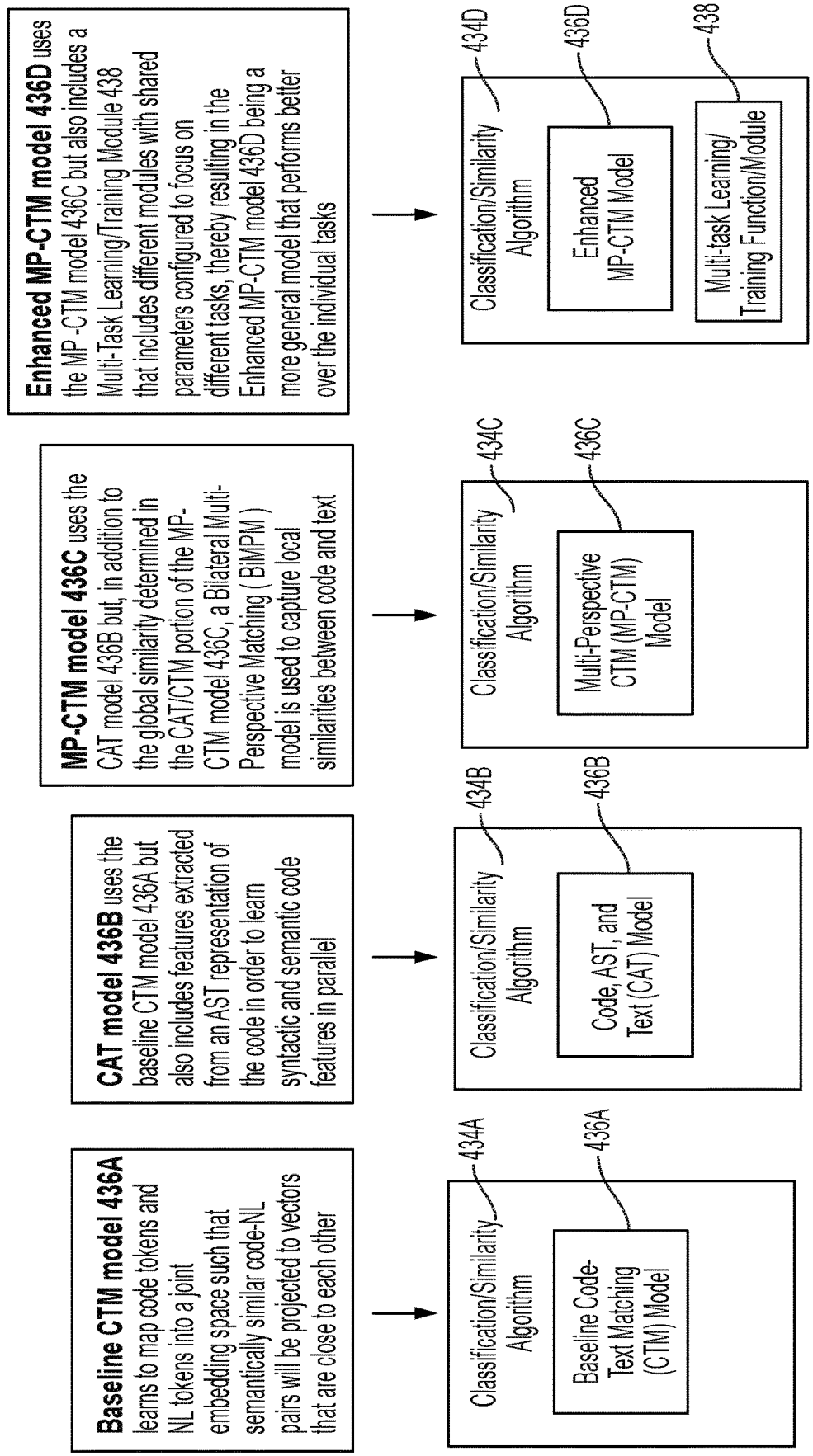
FIG. 6 depicts a series of block diagrams each illustrating an example implementation of the classification/similarity algorithms and code/text relationship models of the code-text analysis system shown in FIG. 4.

In embodiments of the invention, STEP H of the method 500C utilizes a multi-task (MT) learning/training function/module 438 (shown in FIG. 6). More specifically, at STEP H of the method 500C, the MT learning/training function/module 438 is configured to include different modules with shared parameters. STEP H trains different sub-models of the classification/similarity model 436 (shown in FIG. 4) for different, related tasks in such a way that the sub-models share parameters. The MT learning/training function/module 438 sets the parameters (weights) of the classification/similarity model 436 in such a way that the layers of the model that are used for different tasks work well for all of the different tasks, thereby improving performance on the code-text matching task. The portions of the classification/similarity model 436 that are trained in accordance with STEP H include the operations that map the sequence of token vectors into another sequence of c-dimensional vectors that capture contextual information (e.g., as shown in STEPs B of the methods 700A, 700B, 700C, 700D shown in FIGS. 7A-7D). By using the different modules with shared parameters to focus on different tasks, the classification/similarity model 436 can be used to learn a more general model that performs better over these individual tasks than if the different frameworks had been shared separately. In embodiments of the invention, where the main task of the method 500B is code-text matching, the different tasks can include matching source code and natural language, translating source code to natural language, and translating natural language to source code. These tasks are all closely related because they all require the ability to capture whether a piece of natural language describes a piece of code.

The method 500B utilizes the different modules with shared parameters to focus on different tasks, thereby enabling the classification/similarity model 436 to learn a more general model that performs better over these individual tasks than if the different frameworks had been shared separately. In embodiments of the invention, the main task of the method 500B is code-text matching, and the different tasks having shared parameters include the main task of matching source code and natural language, along with the related tasks of translating source code to natural language, and the related task of translating natural language to source code. The main task and the related tasks are closely related because they all require the ability to capture whether a piece of natural language describes a piece of code. Incorporating the MT learning/training function/module 438 results in the classification/similarity model 436 being a more general model that performs better over the individual tasks.

FIG. 6 depicts block diagrams illustrating example implementations of the novel classification/similarity algorithms 434 (shown in FIG. 4) and the classification/similarity models 436 (shown in FIG. 4). In embodiments of the invention, the novel classification/similarity algorithms 434 and classification/similarity models 436 can be implemented as classification/similarity algorithms 434A and a baseline code-text matching (CTM) model 436A configured and arranged to map code tokens and natural language text tokens into a joint embedding space such that semantically similar code-text pairs will be projected to vectors that are close to each other. In accordance with aspects of the invention, the baseline CTM model 436A is a relatively simple model from which the other classification/similarity models 436B, 436C, 436D (shown in FIG. 6) will be built. The baseline CTM model 436A can also be used as a comparison with the other classification/similarity models 436B, 436C, 436D to test the quality of the results achieved using the other classification/similarity models 436B, 436C, 436D. In embodiments of the invention, the baseline CTM model 436A includes an input layer, an output layer, and multiple hidden layers between the input/output layers. Each layer of the baseline CTM model 436A includes nodes, and the layers/nodes are connected with none another in a weighted fashion similar to the neural network 300 (shown in FIG. 3A). In embodiments of the invention, the hidden layers of the CTM model 434A include a word embedding layer, a context representation layer, and a max pooling layer, which are configured and arranged to analyze tokenized and vectored results received at the word embedding layer from the input layer.

Figure 7A:
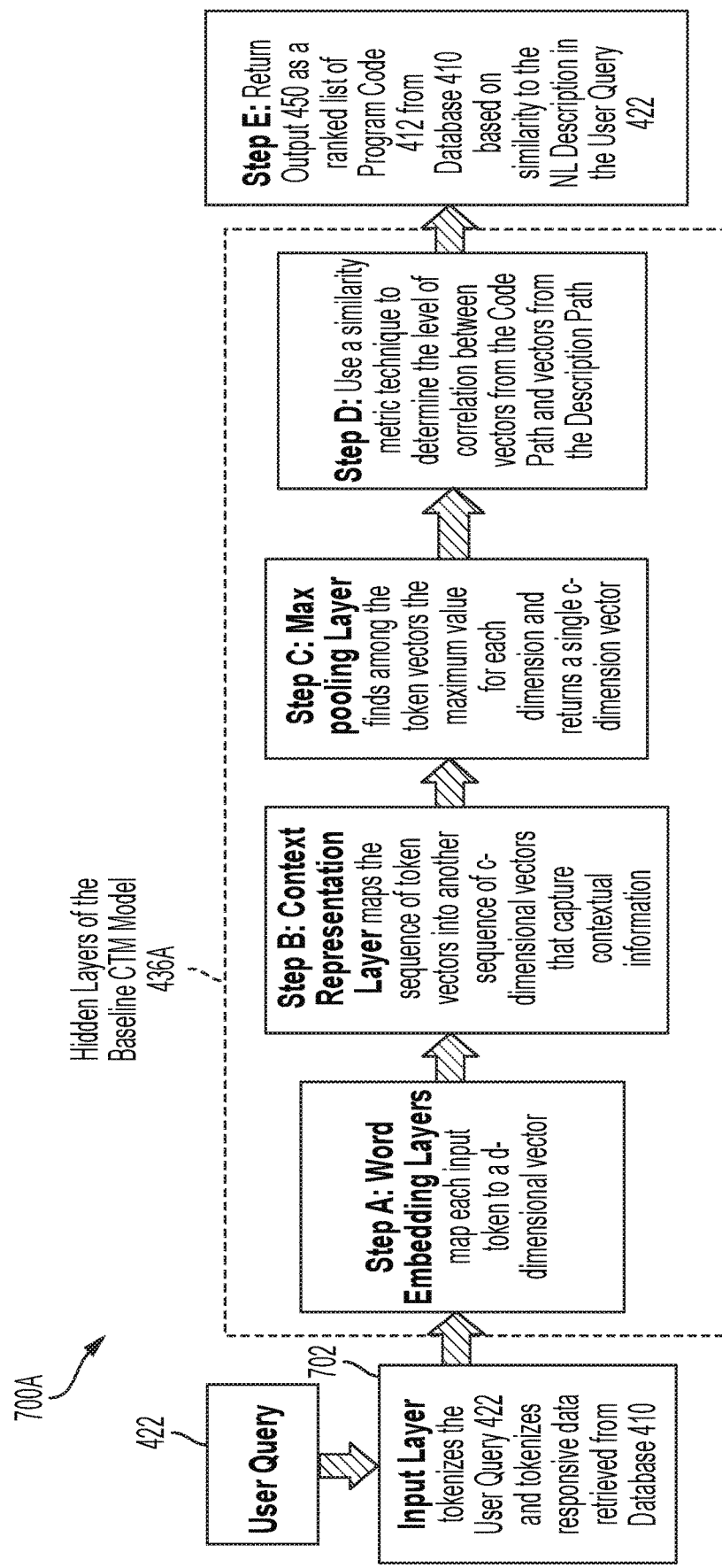
FIG. 7A depicts a flow diagram illustrating example operations of the code-text analysis system and classification/similarity algorithms shown in FIGS. 4 and 6 according to embodiments of the invention.

The operation of the baseline CTM model 436A will now be described with reference to the code-text analysis system 400 shown in FIG. 4, the classification/similarity algorithms 434A and baseline CTM model 436A shown in FIG. 6, and a method 700A shown in FIG. 7A. As best shown in FIGS. 4 and 7A, the computer system 1300 receives the user query 422 from the user 420 and in response thereto accesses the database 410 to retrieve program code 412 and/or natural language text segments 414 to compare with the user query 422. In aspects of the invention, the user query 422 is a request to determine and rank the level of semantic similarity between a given program code segment (e.g., as received in the user query 422) (which may or may not be among the program code 412) and the natural language text segments 414. In aspects of the invention, the user query 422 can be a request to determine and rank the level of semantic similarity between a given natural language text segment (which may or may not be one of the natural language text segments 414) and the program code 412.

Regardless of the specific form of the user query 422, the task to be performed by the baseline CTM model 436A is to solve Equation (1) shown in FIG. 10, wherein, given a program code C (e.g., identified in the user query 422) and a natural language text description D (e.g., one of the natural language code text segments 414 in the database 410), the baseline CTM model 436A determines the level of semantic similarity between C and D. To accomplish this, the baseline CTM model 436A uses its input layer to tokenize the user query 422 and the data retrieved from the database 410 for comparison with the user query 422. The baseline CTM model 436A uses its hidden layers to map the tokenized C sequence and the tokenized D sequence into vectors ($v_c$, vd) in the same embedding space then calculates the cosine similarity score of the vectors as shown in Equation (1). The embeddings are computed by the hidden layers of the baseline CTM model 436A, namely, the word embedding layer, the context representation layer, and the max pooling layer, each of which is described in the following paragraphs.

As shown in FIG. 7A, at STEP A of the method 700A, the word embedding layer receives C tokens and D tokens from the input layer 702 and represents C and D using a dense vector representation (e.g., the embeddings 330 shown in FIG. 3B). The position of a word within the vector space is learned from text and is based on the words that surround the word when it is used. The position of a word in the learned vector space is referred to as its embedding. In operation, the word embedding layer receives the tokenized C and D and maps each input token into a d-dimensional vector. In embodiments of the invention, these embeddings can be pre-trained using, for example, the FastText open-source lightweight library. FastText allows users to learn text representations and text classifiers. FastText can be downloaded at www.fasttext.cc. In embodiments of the invention, the embeddings can be fine-tuned during training of the baseline CTM model 436A. In a suitable fine-tuning technique continuously updates the word embeddings during training of the overall model, which is in contrast to training word embeddings separately and keeping them fixed.

At STEP B of the method 700A, the context representation layer uses bi-directional long short-term memory (LSTM) to map the sequence of C and D token vectors into another sequence of c-dimensional vectors that capture contextual information. The bidirectional LSTM trains two instead of one LSTM on the input sequence. The first training on the input sequence as-is, and the second training is on a reversed copy of the input sequence. This approach can provide additional context to the baseline CTM model 436A and results in faster and even fuller learning on the problem.

At STEP C of the method 700A, the max pooling layer is used to find among the sequence of C and D vectors output by the context representation layer the maximum value for each dimension and return a single c-dimensional vector. C and D are each a sequence of d-dimensional vectors. The max-pooling layer maps an arbitrary length sequence of d-dimensional vectors into a single d-dimensional vectors. The down-sampling of the max pooling layer can be implemented by partitioning the input vector sequences into a set of non-overlapping rectangles and, for each such sub-region, output the maximum. The max pooling layer serves to control over-fitting by progressively reducing the spatial size of the representation, as well as reducing the number of parameters, the memory footprint, and amount of computation in the baseline CTM model 436A. The baseline CTM model 436A contains two sets of the above-described hidden layers—one for the sequence of C tokens and the other for the sequence of D tokens.

At STEP D of the method 700A, the baseline CTM model 436A uses a similarity metric technique to determine the level of correlation between the C vector and the D vector output from the baseline CTM model's hidden layers. In general, similarity metric techniques are used to determine the similarity between two things. A similarity score can be developed by quantifying different attributes of data objects then employing different similarity algorithms across those attributes to yield similarity scores between the different data objects. In embodiments of the invention, the similarity metric technique can be a cosine similarity technique configured to compute the cosine similarity of the C/D vector pairs output from the baseline CTM model's hidden layers. Using the baseline CTM model 436A to execute the method 700A, semantically similar C/D pairs will be projected to vectors that are close to each other, thereby generating a global-level (or sequence-level) similarity evaluation of the C/D pair.

In some aspects of the invention, the baseline CTM model 436A can be configured to utilize algorithms that apply confidence levels (CLs) to various ones of its results/determinations (e.g., the above-described similarity score) in order to improve the overall accuracy of the particular result/determination. When the baseline CTM model 436A makes a determination or generates a result (i.e., a similarity score between C and D) for which the value of CL is below a predetermined threshold (TH) (i.e., CL<TH), the result/determination can be classified as having sufficiently low "confidence" to justify a conclusion that the determination/result is not valid. If CL>TH, the determination/result can be considered valid and the determination/result can participate in downstream processing. Many different predetermined TH levels can be provided. The determinations/results with CL>TH can be ranked from the highest CL>TH to the lowest CL>TH in order to prioritize when, how and if the determinations/results are handled in downstream processing.

At STEP E of the method 700A, the computing system 1300 generates the output 450 in a flexible format and structure that captures the learned relationship between program code segments and natural language text segments. The specific format and structure of the output 450 shown in FIG. 4 is one example, and the code-text analysis system 400 and the computing system 1300 can be programmed to generate the output 450 in other formats and structures that match the specific embodiment of the user query 422 and the classification/similarity algorithm 434A that are being used.

Figure 7B:
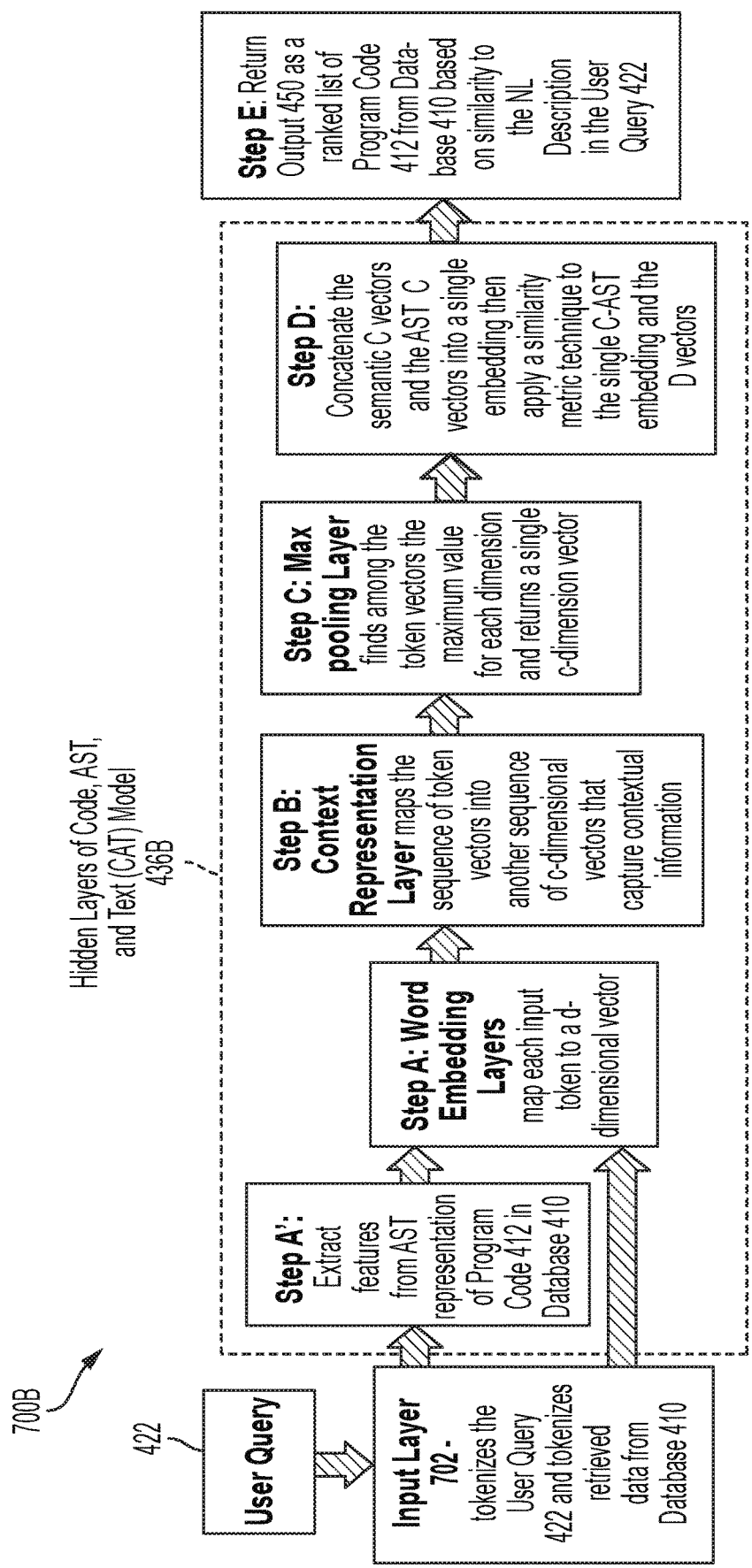
FIG. 7B depicts a flow diagram illustrating example operations of the code-text analysis system and classification/similarity algorithms shown in FIGS. 4 and 6 according to embodiments of the invention.

In embodiments of the invention, the novel classification/similarity algorithms 434 and the classification/similarity models 436 can be implemented as novel classification/similarity algorithms 434B and a code, AST, and text (CAT) model 436B. The operation of the novel CAT model 436B will now be described with reference to the code-text analysis system 400 shown in FIG. 4, the classification/similarity algorithms 434B and CAT model 436B shown in FIG. 6, and a method 700B shown in FIG. 7B. As best shown in FIGS. 4 and 7B, the computer system 1300 receives the user query 422 from the user 420 and in response thereto accesses the database 410 to retrieve program code 412 and/or natural language text segments 414 for comparison with the user query 422. In aspects of the invention, the user query 422 is a request to determine and rank the level of semantic similarity between a given program code segment (e.g., as received in the user query 422) (which may or may not be among the program code 412) and the natural language text segments 414. In aspects of the invention, the user query 422 can be a request to determine and rank the level of semantic similarity between a given natural language text segment (which may or may not be one of the natural language text segments 414) and the program code 412 stored in the database 410.

In embodiments of the invention, the CAT model 436B uses the same layer architecture (including the input layer) as the baseline CTM model 436A (STEPS A, B, and C in FIG. 7B), but the method 700B performed by the CAT model's layer architecture is augmented to include STEP A', in which features are extracted from an AST representation of C in order to learn both syntactic (STEP A') and semantic (STEPS A, B, and C in FIG. 7B) C features in parallel with one another. The CAT model's layer architecture is configured to, at STEP D of the method 700B, concatenate the semantic C vectors and the AST (or syntactic) C vectors into a single embedding then apply a similarity metric technique (e.g., a cosine similarity technique) to the single C-AST embedding and the D vectors. Thus, the layer architecture of the CAT model 436B includes the same three hidden layers as the baseline CTM model 436A except the layer architecture of the CAT model 436B includes three sets of the three CTM hidden layers (STEPS A, B, and C in FIG. 7B), namely, one set of CTM hidden layer for each embedding of the C sequence, the AST sequence, and the D sequence.

At STEP E of the method 700B, the computing system 1300 generates the output 450 in a flexible format and structure that captures the learned relationship between program code segments and natural language text segments. The specific format and structure of the output 450 shown in FIG. 4 is one example, and the code-text analysis system 400 and the computing system 1300 can be programmed to generate the output 450 in other formats and structures that match the specific embodiment of the user query 422 and the classification/similarity algorithm 434B that are being used.

Figure 7C:
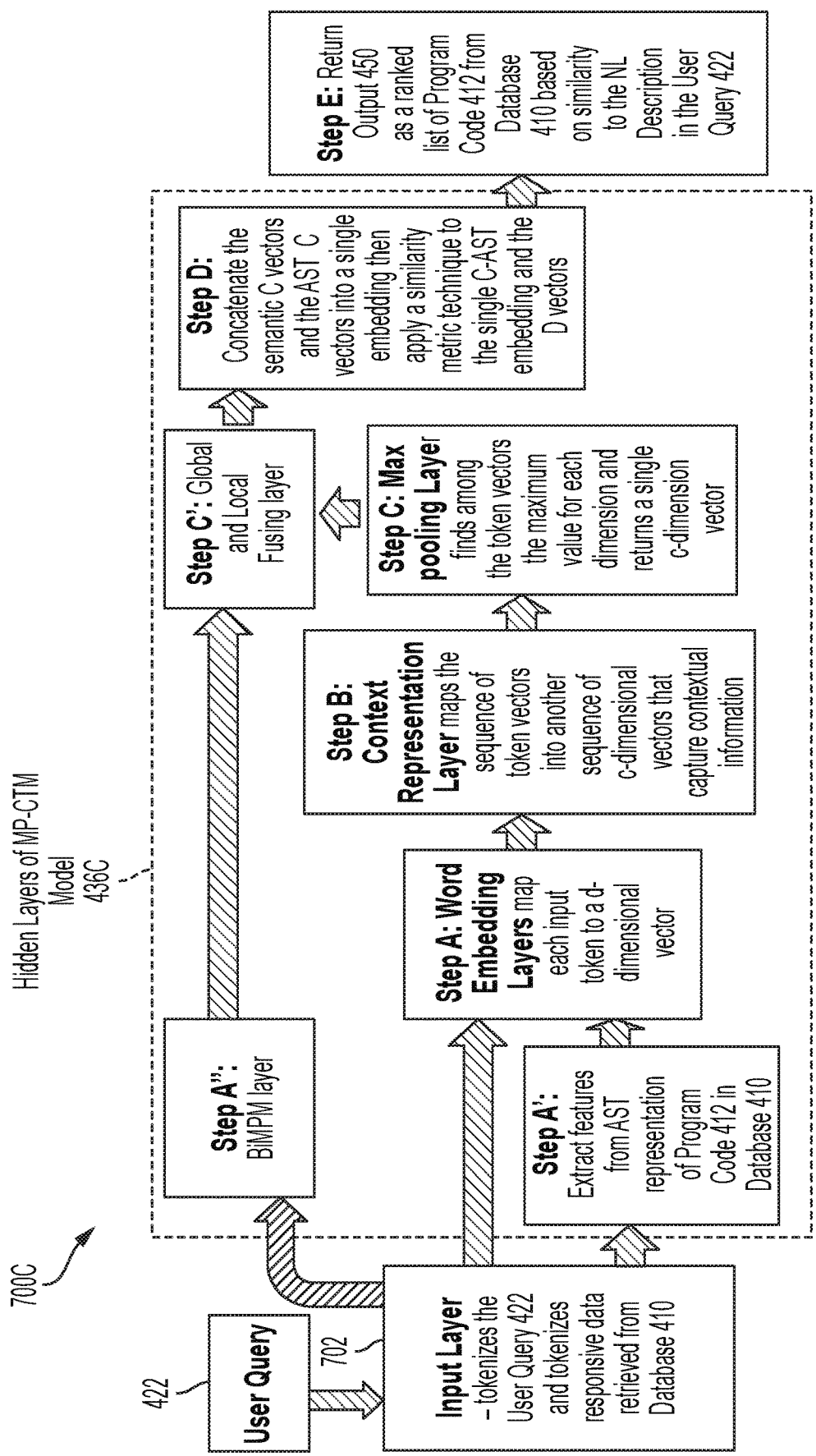
FIG. 7C depicts a flow diagram illustrating example operations of the code-text analysis system and classification/similarity algorithms shown in FIGS. 4 and 6 according to embodiments of the invention.

In embodiments of the invention, the novel classification/similarity algorithms 434 and classification/similarity models 436 can be implemented as novel classification/similarity algorithms 434C and a multi-perspective CTM (MP-CTM) model 436C. The operation of the novel MP-CTM model 436C will now be described with reference to the code-text analysis system 400 shown in FIG. 4, the classification/similarity algorithms 434C and MP-CTM model 436C shown in FIG. 6, and a method 700C shown in FIG. 7C. As best shown in FIGS. 4 and 7C, the computer system 1300 receives the user query 422 from the user 420 and in response thereto accesses the database 410 to retrieve program code 412 and/or natural language text segments 414 for comparison with the user query 422. In aspects of the invention, the user query 422 is a request to determine and rank the level of semantic similarity between a given program code segment (e.g., as received in the user query 422) (which may or may not be among the program code 412) and the natural language text segments 414 stored in the database 410. In aspects of the invention, the user query 422 can be a request to determine and rank the level of semantic similarity between a given natural language text segment (which may or may not be one of the natural language text segments 414) and the program code 412.

In embodiments of the invention, the MP-CTM model 436C uses the same layer architecture as the CAT model 436B. However, in addition to the global similarity determined in the CTM and AST portions of the MP-CTM model 436C, at STEP A" of the method 700C, a bilateral multi-perspective matching (BiMPM) function/module is used to capture local similarities between C and D, and at STEP C' of the method 700C, a global and local fusing layer is used to fuse the local and global similarities. Known approaches to BiMPM use it to compute similarities over pairs of sentences from the same language. In contrast, aspects of the invention apply BiMPM cross-linguistically (e.g., across natural language text and computer program code) to assess similarity of D and C. Additionally, known approaches to BiMPM use it as a binary classification algorithm. In contrast, aspects of the invention take the vectors computed by BiMPM, concatenate them with vectors computed by the CAT model, and compute a cosine similarity of these vectors for C and D. In further contrast to known BiMPM models, aspects of the invention utilize a novel Bi-MPM layer configured to take into account not only high-level features of code and text but also low-level features of semantic code (and, optionally, syntactic (AST) code) and text descriptions. Thus, in addition to the global similarity determined in the baseline CTM model portion of the MP-CTM model, the novel BiMPM layer captures local similarities between C and D. Accordingly, the novel MP-CTM model 436C takes into account not only high-level features of semantic program code representations, syntactic (AST) program code representations (optionally), and natural language text representations, but also takes into account low-level features of semantic program code representations, syntactic (AST) program code representations (optionally), and natural language text representations. In embodiments of the invention, the MP-CTM model's hidden layer architecture includes a raw representation layer, a context representation layer, a global-level sequence aggregation layer, the novel BiMPM layer, a global and local fusing layer, and a final similarity prediction layer.

An example implementation of a suitable BiMPM layer is shown in FIG. 8 and is described in greater detail subsequently herein in connection with the description of a MP-CTM model 436C' shown in FIG. 8. In embodiments of the invention, the MP-CTM model 436C shown in FIGS. 6 and 7C can be implemented as the MP-CTM model 436C' having a raw representation layer, a context representation layer, a global-level sequence aggregation layer, a BiMPM layer, a global and local fusing layer, and a final similarity prediction layer. Additional details of the MP-CTM model 436C' are described subsequently herein in connection with the description of FIG. 8.

At STEP D of the method 700C, the MP-CTM model 436C applies a similarity metric technique (e.g., a cosine similarity technique) to the output of the global and local fusing layer at STEP C'. Accordingly, in addition to the core features provided in the CAT model 436B (shown in FIGS. 4 and 7B), the MP-CTM model 436C takes into account not only high-level (i.e., sequence level) features of semantic C representations, syntactic C representations (i.e., AST), and D representations, but also low-level (i.e., token/word level) features of semantic C representations, syntactic C representations (i.e., AST), and D representations.

At STEP E of the method 700C, the computing system 1300 generates the output 450 in a flexible format and structure that captures the learned relationship between program code segments and natural language text segments. The specific format and structure of the output 450 shown in FIG. 4 is one example, and the code-text analysis system 400 and the computing system 1300 can be programmed to generate the output 450 in other formats and structures that match the specific embodiment of the user query 422 and the classification/similarity algorithm 434C that are being used.

In embodiments of the invention, the novel classification/similarity algorithms 434 and classification/similarity models 436 can be implemented as novel classification/similarity algorithms 434D and an enhanced MP-CTM model 436D with multi-task (MT) learning/training functions/modules 438. The MP-CTM model 436D is enhanced in that it is configured to utilize the MT learning/training functions/modules 438, which include different functions/modules with shared parameters. The MT learning/training function/module 438, in accordance with aspects of the invention, leverages an observation that tasks such as code summarization, code generation, code retrieval, and code-text matching are closely related because they all require the ability to capture whether a segment of natural language text describes a segment of code. For example, code summarization models typically follow the encoder-decoder (i.e., seq2seq) framework from neural machine translation (NMT), but this translation task can also be used for other applications like code retrieval. Code-Text matching can be used as an auxiliary task for downstream applications like code retrieval, for example, by using a matching model along with a summarization model to compute similarity scores between source code and natural language pairs.

By configuring the MT learning/training function/module 438 to provide the enhanced MP-CTM model 436D with different modules to focus on different tasks, the enhanced layer architecture of the enhanced MP-CTM model 436D can learn a more general model that performs better over these individual tasks than if the different frameworks had been shared separately. In embodiments of the invention, the different tasks can include matching code and natural language, translating code to natural language, and translating natural language to code, all of which are closely related because they require the ability to capture whether a piece of natural language describes a piece of code. Incorporating the MT learning/training function/module 438 results in the enhanced MP-CTM model 436D being a more general model that performs better over the individual tasks.

Figure 7D:
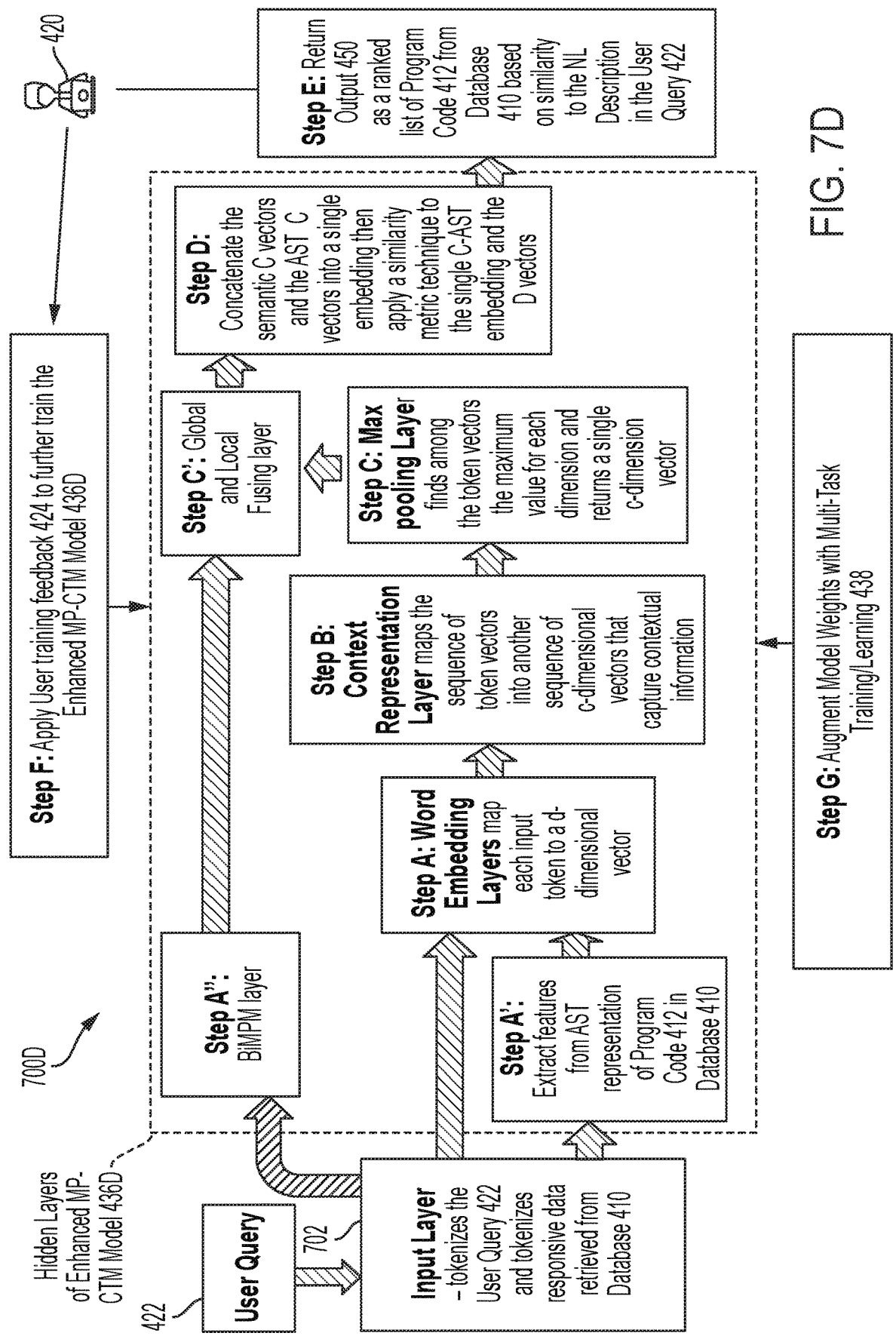
FIG. 7D depicts a flow diagram illustrating example operations of the code-text analysis system and classification/similarity algorithms shown in FIGS. 4 and 6 according to embodiments of the invention.

The operation of enhanced MP-CTM model 436D and MT learning/training model 438 will now be described with reference to the code-text analysis system 400 shown in FIG. 4; the classification/similarity algorithms 434D, the enhanced MP-CTM model 436D, and the MT learning/training function/module 438; and the method 700D shown in FIG. 7D. As best shown in FIGS. 4 and 7D, the computer system 1300 receives the user query 422 from the user 420 and in response thereto accesses the database 410 to retrieve program code 412 and/or natural language text segments 414 for comparison with the user query 422. In aspects of the invention, the user query 422 is a request to determine and rank the level of semantic similarity between a given program code segment (e.g., as received in the user query 422) (which may or may not be among the program code 412) and the natural language text segments 414. In aspects of the invention, the user query 422 can be a request to determine and rank the level of semantic similarity between a given natural language text segment (which may or may not be one of the natural language text segments 414) and the program code 412.

In embodiments of the invention, the enhanced MP-CTM model 436D uses the same layer architecture as the MP-CTM model 436C (STEPS A, A', A'', B, C, C' and D in FIG. 7D), but the method 700D performed by the layer architecture of the enhanced MP-CTM model 436D is enhanced by utilizing the MT learning/training function/module 438. More specifically, at STEP G of the method 700D, the MT learning/training function/module 438 is configured to include different, related modules with shared parameters. In accordance with aspects of the invention, these parameters are the sets of weights that determine the connection strengths between pairs of nodes in the enhanced MP-CTM model 436D of the classification/similarity algorithm 434D (or neural network). Two models that share parts of their architecture (e.g. a subset of layers) have shared parameters if they use the same sets of weights for some or all of the layers in the shared architecture. The different, related tasks can include matching code and text; translating from code to text; translating from text to code; and the like.

In embodiments of the invention where the main task of the enhanced MP-CTM model 436D and MT learning/training function/module 438 is code-text matching, the different, related tasks can include matching source code and natural language, translating source code to natural language, and translating natural language to source code. These tasks are all closely related because they all require the ability to capture whether a piece of natural language describes a piece of code.

The enhanced MP-CTM model 436D and MT learning/training function/module 438 utilize the different, related modules with shared parameters to focus on different tasks, thereby enabling the enhanced MP-CTM model 436D to learn a more general model that performs better over these individual tasks than if the different frameworks had been shared separately. In embodiments of the invention, the main task of the enhanced MP-CTM model 436D and MT learning/training function/module 438 is code-text matching, and the different tasks having shared parameters include the main task of matching source code and natural language, along with the related task of translating source code to natural language, and the related task of translating natural language to source code. The main task and the related tasks are closely related because they all require the ability to capture whether a piece of natural language describes a piece of code. Incorporating the MT learning/training function/module 438 results in the enhanced MP-CTM model 436D being a more general model that performs better over the individual tasks In embodiments of the invention, the MT learning/training function/module 438 shown in FIGS. 6 and 7D can be implemented as a MT learning/training function/module 438A shown in FIG. 9. Additional details of the MT learning/training function/module 438A are provided subsequently herein in connection with the description of FIG. 9.

At STEP E of the method 700D, the computing system 1300 generates the output 450 in a flexible format and structure that captures the learned relationship between program code segments and natural language text segments. The specific format and structure of the output 450 shown in FIG. 4 is one example, and the code-text analysis system 400 and the computing system 1300 can be programmed to generate the output 450 in other formats and structures that match the specific embodiment of the user query 422 and the classification/similarity algorithm 434D that are being used.

At STEP F of the method 700D, the computer system 1300 and the MP-CTM model 436D receives user training feedback 424 from the user 420 based on a review by the user 420 of the output 450. In embodiments of the invention, the format of the output 450 can include a user feedback region where the user 420 can electronically enter user feedback on one or more of the code/text pairs returned in the output 450. The computer system 1300 can receive the user training feedback 424 through the user feedback region of the output 450 and provide the user training feedback 424 to the classification/similarity algorithms 434D, which is configured to use the user training feedback 424 to further train the enhanced MP-CTM models 436. In some embodiments of the invention, the output 450 can include an automatically generated dialogue box that is configured to prompt the user 420 to provide the user training feedback 424 in the user feedback region of the output 450. In embodiments of the invention, the user training feedback 424 can identify the code/text pairs returned by the enhanced MP-CTM model 436D wherein the code and the text in the code/text pair are relevant to one another. In embodiments of the invention, the user training feedback 424 can identify the code/text pairs returned by the enhanced MP-CTM model 436D wherein the code and the text returned in the code/text that are not relevant to one another. In embodiments of the invention, the user training feedback 424 can identify the code/text pairs returned by the enhanced MP-CTM model 436D wherein the code and the text in the code/text pair are relevant to one another, along with identifying the code/text pairs returned by the enhanced MP-CTM model 436D wherein the code and the text in the code/text pair are not relevant to one another. In some embodiments of the invention, the user training feedback 424 can be provided on a scale, for example, a scale ranging from 1 through to 10, where 10 indicates that the code and the text in the code/text pair are 100% relevant to one another, and where 1 indicates that the code and the text in the code text pair are 0% relevant to one another. In aspects of the invention, the user training feedback 424 is only utilized during an initial training of the model 436D. In aspects of the invention, the user training feedback 424 can be utilized during periodic post-initial-training (or updated) training of the model 436D.

It is noted that STEP F of the method 700D can be incorporated into methods 700B and 700C shown in FIGS. 7B and 7C.

Turning now to FIG. 8, as previously noted herein, in some embodiments of the invention, the MP-CTM model 436C can be implemented as the MP-CTM model 436C' shown in FIG. 8. In order to capture local (i.e., word/token level) similarities between code and text sequences, embodiments of the invention provide a novel application of the BiMPM layer shown in FIG. 8 in a manner that allows the MP-CTM model 436C' to take into account not only high-level (i.e., sequence level) features of code and text but also low-level (i.e., word/token level) features of code (and AST) and text descriptions. As shown in FIG. 8, the MP-CTM model 436C' includes a raw representation layer, a context representation layer, a global-level sequence aggregation layer, a BiMPM layer, a global and local fusing layer, and a final similarity prediction layer, each of which is described in greater detail below.

In embodiments of the invention, the raw representation layer of the MP-CTM model 436C' takes as input the code sequence, the AST sequence, and the description sequence independently. In embodiment of the invention, the raw representation layer uses sub-word regularization based on unigram language modeling to transform the original tokens into sequences of shorter (and hence more common) sub-strings. The inventors have conducted experiments to confirm the efficacy of this approach to implementing the raw representation layer by comparing models trained on raw (tokenized) source code and text with corresponding models trained on pre-processed code and text. In embodiments of the invention, the FastText open-source lightweight library is trained to obtain sub-word embeddings for all of the pre-processed and tokenized text, code and AST strings, which are used at the inputs to the raw representation layer. The output of the raw representation layer is three sequences of token embeddings, one for each of the input sequences including code sequence(s), AST sequence(s), and description sequence(s).

In accordance with aspects of the invention, the embeddings generated by the raw representation layer are context-free and independent of the presence of other words in the sequence. The context representation layer is configured and arranged to incorporate contextual information into the representations of both sequences. A bi-directional long short-term memory (BiLSTM) is used for this purpose. The output of the context representation layer is also two sequences of vectors except that now these vectors contain contextual information. Each position in the sequence corresponds to the hidden state vector returned by the LSTM at that time-step.

In accordance with aspects of the invention, in the global-level sequence aggregation layer the embeddings of the code sequence, the AST sequence, and the description sequence generated from the context representation layer are used to produce global-level embedding of the whole sequence accordingly. In embodiments of the invention, the global-level sequence aggregation layer uses simple max-pooling to compute the global-level embedding. For the code sequence and the AST sequence, their corresponding global-level hidden representations are concatenated into a single global-level vector embedding for code input.

In accordance with aspects of the invention, the BiMPM layer contains two different layers, namely the BiMPM matching layer and the BiMPM local aggregation layer. The goal of the BiMPM layer is to first compare each contextual embedding in a code sequence with another text sequence then aggregate local feature vectors into a single local-level vector. The BiMPM matching layer matches two sequences P and Q in two directions, namely, matching each position in the sequence P with all positions in the sequence Q, and matching each position in the sequence Q with all positions in the sequence P. The output of this layer is also two sequences of vectors, where each vector in the first sequence contains the matching result of the corresponding position in the sequence P against all positions in the sequence Q, and where each vector in the second sequence contains the matching result of the corresponding position in the sequence Q against all positions in the sequence P. The main component of BiMPM's matching layer is a multi-perspective cosine matching function $f_m$ which is used to compare two vectors in Equation (2) (shown in FIG. 10), where $v_1$ and $v_2$ are two d-dimensional vectors (d being the dimension of the token embeddings), $W \in R^{l \times d}$ is the matrix of trainable parameters of the model, and m is an l-dimensional vector. Each element $m_k \in m$ is the cosine similarity between the two weighted vectors (° is elementwise multiplication, and $W_k$ is the k-th row of W) in Equation (3) shown in FIG. 10.

In aspects of the invention, the BiMPM layer can employ four different matching strategies, namely full-matching, maxpool-matching, attentive-matching and max-attentive-matching. In contrast to known approaches, embodiments of the invention implement the above-described matching strategies for code-text sequences instead of for text-text sequences. The BiMPM local aggregation layer aggregates the sequence it receives from the BiMPM matching layer using another biLSTM, and computes a fixed length local-level hidden representation. Aspects of the invention pass both of these code and text sequences through another biLSTM layer. The value of the final hidden state of this layer is the fixed-length local-level vector representing the hidden embedding of the whole input sequence, one for code and one for text.

In aspects of the invention, once both global-level hidden representations of code and text sequences are obtained from the global-level sequence aggregation layer, and the local-level hidden representations of code and text sequences are obtained from the BiMPM layer, this information is fused in order to capture both global-level and local-level context information. In aspects of the invention, a concatenation function can be used to fuse these vectors for simplicity.

In aspects of the invention, the similarity prediction layer is a simple two-layer feed-forward neural network that reads in the fixed length vectors that represent both global-level and local-level feature information of input code and text sequences, and applies a cosine function on the output layer to compute the probability of the two sequences being semantically similar. Because of the use of similarity score prediction, the number of output nodes is between 0 and 1.

Figure 9:
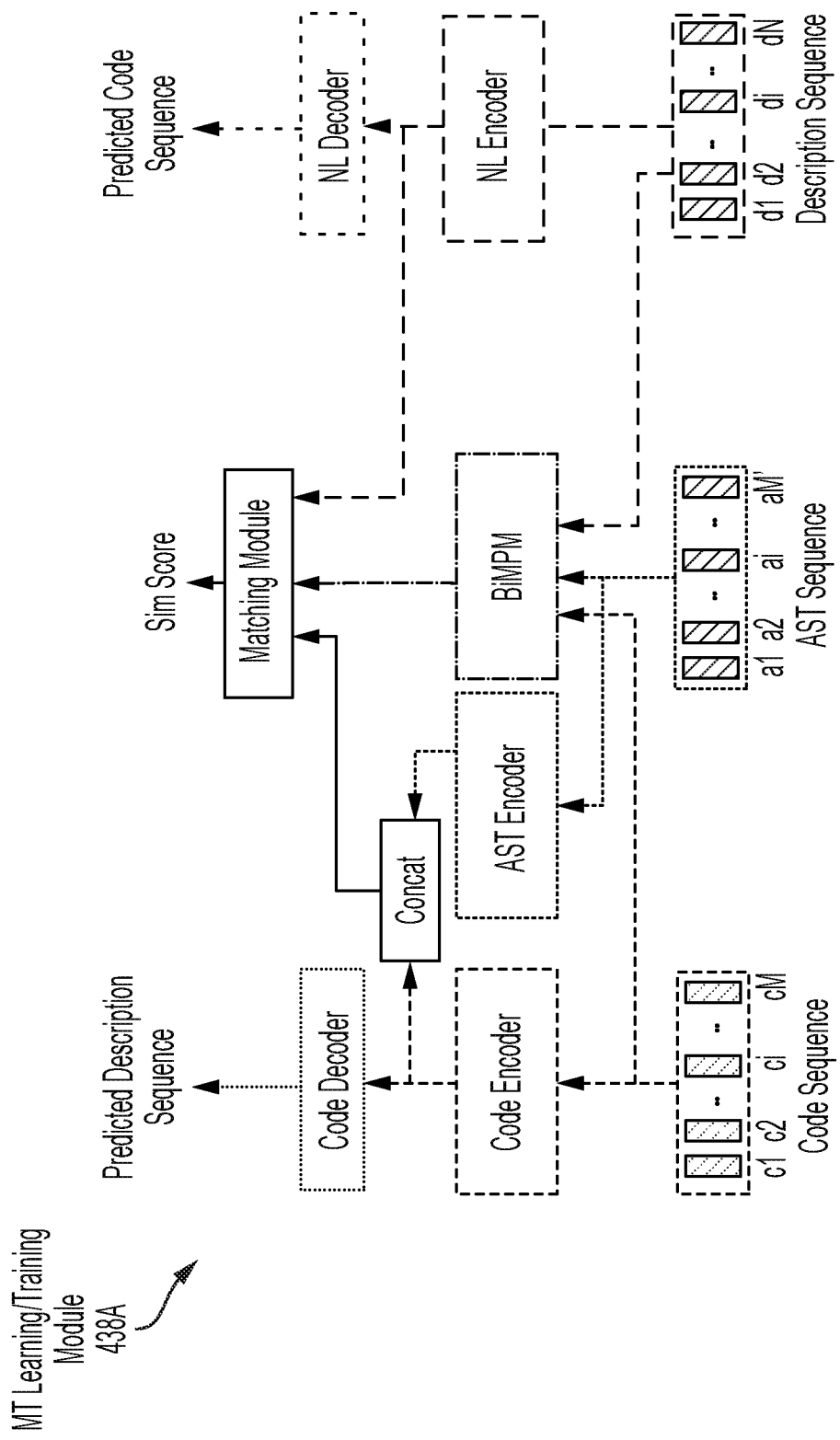
FIG. 9 depicts a block diagram illustrating an example implementation of the multi-task (MT) learning/training function/module shown in FIG. 6.

Turning now to FIG. 9, as previously noted herein, in embodiments of the invention the MT learning/training function/module 438 of the enhanced MP-CTM model 436D shown in FIGS. 6 and 7D can be implemented as the MT learning/training function/module 438A shown in FIG. 9. In accordance with aspects of the invention, the MT learning/training function/module 438A is configured to consider two related tasks, namely a code-to-description translation model and a description-to-code translation model. The code-to-description translation model uses an encoder-decoder framework with attention. The encoder-decoder framework (or model) used in aspects of the invention is an architecture configured and arranged to operate in a recurrent neural network for a sequence-to-sequence prediction problem. The encoder-decoder framework includes an encoder sub-model communicatively coupled to a decoder sub-model. The encoder sub-model is responsible for stepping through the input time steps and encoding the entire sequence into a fixed length vector called a context vector. The decoder sub-model is responsible for stepping through the output time steps while reading from the context vector.

A problem with the encoder-decoder framework is that performance can degrade when the input and/or output sequences are relatively long. The reason is believed to be because of the fixed-sized internal representation used by the encoder sub-model. Attention is an extension applied to the encoder-decoder framework that addresses this limitation. In some implementations, the attention technique can work by first providing a richer context from the encoder sub-model to the decoder sub-model and a learning mechanism where the decoder sub-model can learn where to pay attention in the richer encoding sub-model when predicting each time step in the output sequence. More specifically, in some implementations the attention technique can be achieved by keeping the intermediate outputs from the encoder LSTM from each step of the input sequence and training the model to learn to pay selective attention to these inputs and relate them to items in the output sequence. In other words, each item in the output sequence is conditional on selective items in the input sequence. Each time the proposed encoder-decoder framework/model generates a word in a translation, it "soft-searches" for a set of positions in a source sentence where the most relevant information is concentrated. The encoder-decoder framework/model then predicts a target word based on the context vectors associated with these source positions and all the previous generated target words. Thus, the encoder-decoder framework/model encodes the input sentence into a sequence of vectors and chooses a subset of these vectors adaptively while decoding the translation. This frees the encoder-decoder framework/model from having to fit all of the information of a source sentence, regardless of its length, into a fixed-length vector.

Returning to the code-to-description model, the goal of the code-to-description model is code summarization, i.e., given a segment of program code return a natural language sequence that can describe the segment of program code. The description-to-code translation model also uses an encoder-decoder framework with attention. The input to the description-to-code model is a natural language sequence and the output is a segment of source code that performs the task described by the input.

Aspects of the invention leverage an observation that multi-task training of models for related tasks with shared parameters can improve performance. By using the MT learning/training function/module 438A to use different modules with shared parameters to focus the MP-CTM model 438D on different tasks, the MP-CTM model 436D can be used to learn a more general model that performs better over these individual tasks than if we had shared different frameworks separately. In embodiments of the invention, the MT learning/training function/module 438A considers three separate tasks, namely, matching source code and natural language, translating source code to natural language, and translating natural language to source code. During experiments performed on embodiments of the invention, only the code-text matching model is evaluated and its performance is compared with the other baselines.

In accordance with aspects of the invention, the MT learning/training function/module 438A enhances the code-text matching main task by considering the two related tasks of implementing a code-to-description translation model and implementing a description-to-code translation model. The code-to-description translation model uses an encoder-decoder framework with attention. The goal of this code-to-description translation framework/model is code summarization, i.e. given a code snippet (or segment of program code), return a natural language sequence that can describe the given program code. The description-to-code translation model also uses an encoder-decoder framework with attention. The input is a natural language sequence and the output is a snippet of source code (or program code) that performs the main task described by the input.

The MT learning/training function/module 438A considers the three tasks described above, namely, matching source code and natural language, translating source code to natural language, and translating natural language to source code. For this purpose, the MT learning/training function/module 438A includes 6 different modules, namely, a code encoder, a code decoder, a natural language (NL) encoder, a NL decoder, an AST encoder (which is optional), and a matching module. The code encoder and the code decoder together form an encoder-decoder framework for translating a code sequence to a natural language sequence. Similarly, the NL encoder and the NL decoder form an encoder-decoder framework to translate a natural language sequence to a code sequence. Finally, for the matching task, the code encoder, the NL encoder, and the AST encoder produce the high-level features representing the code and the text like the CAT Model 436B (shown in FIGS. 6 and 7B). These representations are then combined with the matching vectors returned by the MP-CTM module 436C, 436C' (shown in FIGS. 6, 7C, and 8) and a similarity technique (e.g., similarity technique 540 shown in FIG. 5A) can be applied thereto. In embodiments of the invention, the above-described representations combined with the matching vectors returned by the MP-CTM module 436C, 436C' can be fed into a similarity module (e.g., the matching module shown in FIG. 8) configured to compute the cosine similarity between these combined vectors. In each iteration, the code-to-language translation task can be trained first, which can be followed by the language-to-code translation task, which can be followed by the similarity module for the matching task. For the experiments described herein, only the code encoder, the AST encoder, the NL encoder and the matching module are used to compute the similarity score between the input code-text pair.

The inventors conducted experiments to confirm the efficacy of the novel C/D models described herein in accordance embodiments of the invention. A dataset known as the CoNaLa dataset was utilized in the experiments. The CoNaLa dataset has two parts, namely, a manually curated parallel corpus consisting of 2,379 training and 500 test examples, and a large automatically-mined dataset with 600k examples. Each example contains a snippet of code and its corresponding natural language description. The code-text pairs 1100 shown in FIG. 11 are examples from the CoNaLa dataset. Because the automatically mined dataset is very noisy, only the curated dataset was used. The models used to create the CoNaLa dataset involved identifying which sub-string of a longer piece of code corresponds to a description. The experiments described herein uses the CoNaLa dataset to perform the code-text matching and the code retrieval tasks.

To use the CoNaLa dataset for text-code matching, the original pieces of code and their descriptions (e.g., code-text pairs 1100 shown in FIG. 11) were used as positive examples. Negative examples were generated by randomly sampling from the annotations in the dataset except from the corresponding one. During training, a triple was used having a code snippet, a correct description, and an incorrect description. For evaluating the matching performance, the experiment(s) included the same number of positive and negative examples. For the retrieval task, for every natural language query D, the rank of its corresponding code snippet C among K+1 candidates was calculated. The remaining K candidates were obtained by sampling randomly from the CoNaLa dataset. In the experiments, K=49.

In the experimental set up, the text-code matching models were trained on triples (C, D+, D−) consisting of a snippet of code C, a natural language description D+ that correctly describes what the code does (a positive example), and a natural language description D− that does not describe what the code does (a negative example). The ranking loss can be minimized using known techniques represented by Equation (4) shown in FIG. 10. The specific details of Equation 10 and how it is used in the experiments are known so have been omitted in the interest of brevity.

All hidden units in the long short-term memory (LSTM) networks used in the experimental models have a dimension size of 200. The experimental token embedding size was set to 300. In the CAT model, because the vectors representing the code and AST respectively are concatenated then compared with the vector representing the natural language description, the first two vectors are each half the dimension size of the third one. The dimensions of the code and AST representations are 100 each, and the dimension of the natural language representation is 200. In each of the LSTM networks, bi-directional LSTMs with one layer are used. The experimental models are implemented in PyTorch and trained using the Adam optimizer with batch size 80.

Embodiments of the MP-CTM model(s) and the enhanced MP-CTM model(s) with MT training/learning modules were compared against four baselines, namely, a code-text (CT) model (corresponds to the previously described baseline CTM module 436A (shown in FIGS. 6 and 7A); a CAT model (corresponds to the CAT model 436B (shown in FIGS. 6 and 7B) configured to incorporate AST features); any simple version of a BiMPM model; and a BiMPM-C, which is the simple BiMPM model enhanced by adding AST features. For code-text matching, accuracy, precision, recall and an F1 score are reported. For code retrieval, Recall@K (K=1,5,10) and mean reciprocal rank (MRR) of the correct answer are reported.

Tables 1 and 2 in FIG. 12A show test set results for text-code matching (with and without pre-processing) and code retrieval (only with pre-processing). In general, pre-processing text simply means bringing text into a form that is predictable and analyzable for the main task at hand. A variety of suitable pre-processing techniques are known, including, for example, lower casing, stemming, normalization, lemmatization, stop word removal, and the like. In Table 1, pre-processing by subword regularization was used and proved consistently improved performance on the matching task. Accordingly, results without pre-processing are omitted from the retrieval results in Table 2.

In going from the first (CT) row to the second (CAT) row in Tables 1 and 2, it is noted that the AST features increase the F-1 score from 0.8388 to 0.8862 without pre-processing and from 0.8619 to 0.8880 with pre-processing. A possible explanation for this is because ASTs contain additional information that is not present in the original code, especially in Python where whitespace matters, and the AST helps maintain information such as variable scope, which is not present in the raw code. The retrieval task sees a very significant boost in MRR from 0.322 to 0.586 just by adding AST features.

Row 3 of Table 1 shows that the BiMPM model by itself gives a fairly low F-1 score of 0.773 on matching without pre-processing, largely due to a significant drop in precision. This increases to 0.870 on the pre-processed data, which is competitive against the other models. BiMPM-C achieves much better performance across the board than BiMPM, outperforming all non-BiMPM-based models on pre-processed data. Even better results were achieved by combining the BiMPM-C model and the CAT model in the MPCTM model (Row 5), yielding the best matching performance on the non-pre-processed data (F-1 score=0.910). Table 2 shows that the BiMPM-C again outperforms BiMPM, although it still performs a little worse than the CAT model. Combining BiMPM-C and CAT to MPCTM improves the Recall@ 1 by a small amount, but performs worse than CAT on all other metrics.

Adding the Multi-task component to the MPCTM model (i.e. MPCTM-MT) improves the matching recall (and hence overall performance) on pre-processed data, and yields the best F-1 score of 0.922. On the retrieval task, MPCTM-MT has the best performance with an MRR of 0.587 and Recall@1 of 0.397. However, it is also noteworthy that, without pre-processing, multitask training can result in a slight decrease in performance. A possible explanation is because translation requires subword regularization for coverage. A so-called BLEU score calculation also can provide insights on performance. BLEU stands for the bilingual evaluation understudy and is a score for comparing a candidate translation of text to one or more reference translations. Although developed for translation, it can be used to evaluate text generated for a suite of natural language processing tasks. For the code generation task, also known as translating natural language to code, a BLEU score of 6.51 without multi-task training is obtained, and a BLEU score of 9.41 with multi-task training is obtained. For code summarization, or translation from code to natural language, a BLEU score of 4.16 without multi-task training is obtained, and a BLEU score of 4.88 with multi-task training is obtained. While these scores are low, it shows that using multi-task training in accordance with aspects of the invention, improves performance. A possible explanation for the translation scores being so low is because a very simplistic translation model is being used as a baseline model, given that the primary focus was on the code-text matching and code retrieval tasks.

The top 5 results returned from a case study portion of the experiments are shown in FIG. 12B as Returned Results A, B, and C. The novel MPCTM-MT model was used to generate the Returned Results A & B. These returned results are consistent with the scores shown in Table 2 of FIG. 12A. For the query "change current working directory", the top 5 results returned are shown in FIG. 12B as Returned Results A. The model correctly ranks the correct result highest. Interestingly, the next 2 results are OS-related commands, so the model correctly shows that OS-related commands have high semantic similarity with the query because it contains the term "directory."

For another query "remove all whitespace in a string 'sentence;" the top 5 results returned are shown in FIG. 12B as Returned Results B. Here, the correct result is ranked second in the returned list of results. However, the remaining results are all string operations because they contain the join function and regex operations, suggesting that the model understands that the user is looking for something related to strings.

For the query "merge lists ['it'] and list ['was'] and list ['annoying'] into one list" the top 5 results returned are shown in FIG. 12B as Returned Results C. The model correctly ranks the required code snippet highest. It is noteworthy that, like the previous cases, the other snippets returned by the model involve lists and list operations like list comprehensions. This shows that the model successfully understands that the user query involves lists.

Thus it can be seen from the foregoing detailed description that embodiment of the invention provide technical benefits and effects. Embodiments of the invention provide technical solutions for the cross-lingual tasks of code-text matching and code retrieval. Embodiments of the invention provide a deep neural network having a novel MP-CTM model and/or a novel MP-CTM model with multi-task learning/training for this task. The multi-perspective features of the model(s) evaluate global (or sequence-level) interactions between code and text, as well as local (or word-level) interactions between code and text. In contrast to known approaches, the multi-perspective nature of the MP-CTM model allows it to capture richer word-level and sequence-level similarities between the code and natural language text input sequences. The multi-task features of the model can train the model's main task using shared parameters taken from tasks that are relevant to the main task. Finally, experiments have been conducted to indicate that pre-processing source code and natural language text inputs with sub-word regularization can improve the results of the disclosed multi-perspective models and the disclosed multi-task models that are trained on the above-described translation tasks.

Figure 13:
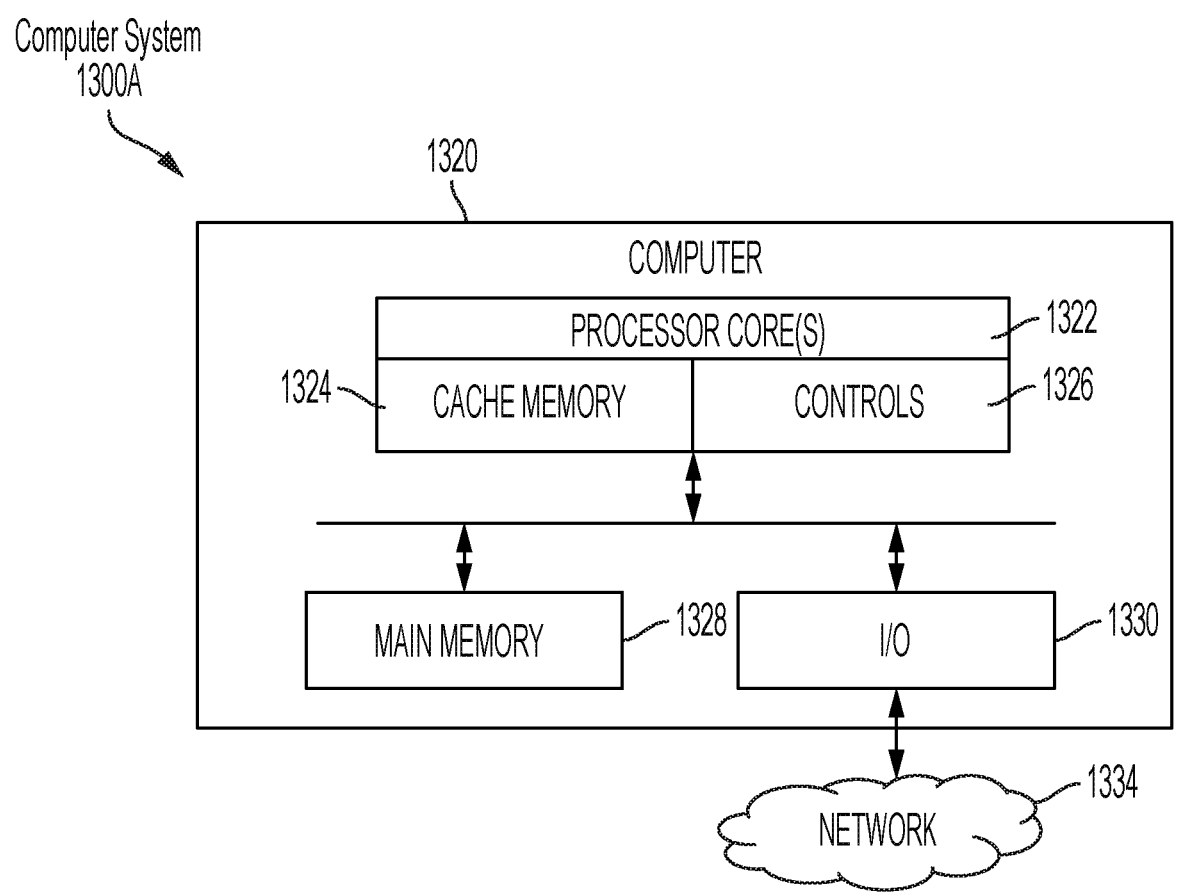
FIG. 13 depicts a computer system capable of implementing aspects of the invention.

FIG. 13 illustrates an example of a computer system 1300A that can be used to implement the computer-based components of the neural network system 300 and the code-text analysis system 400 shown in FIGS. 3A and 4. The computer system 1300A includes an exemplary computing device ("computer") 1302 configured for performing various aspects of the content-based semantic monitoring operations described herein in accordance aspects of the invention. In addition to computer 1302, exemplary computer system 1300A includes network 1314, which connects computer 1302 to additional systems (not depicted) and can include one or more wide area networks (WANs) and/or local area networks (LANs) such as the Internet, intranet(s), and/or wireless communication network(s). Computer 1302 and additional system are in communication via network 1314, e.g., to communicate data between them.

Exemplary computer 1302 includes processor cores 1304, main memory ("memory") 1310, and input/output component(s) 1312, which are in communication via bus 1303. Processor cores 1304 includes cache memory ("cache") 1306 and controls 1308, which include branch prediction structures and associated search, hit, detect and update logic, which will be described in more detail below. Cache 1306 can include multiple cache levels (not depicted) that are on or off-chip from processor 1304. Memory 1310 can include various data stored therein, e.g., instructions, software, routines, etc., which, e.g., can be transferred to/from cache 1306 by controls 1308 for execution by processor 1304. Input/output component(s) 1312 can include one or more components that facilitate local and/or remote input/output operations to/from computer 1302, such as a display, keyboard, modem, network adapter, etc. (not depicted).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of implementing a neural network model configured to execute a first task comprising determining a level of similarity between a first text segment and a second text segment, the computer-implemented method comprising:
    receiving, using a processor, a query comprising the first text segment;
    wherein the first text segment comprises a first text segment (FTS) sequence comprising at least one FTS character grouped into at least one FTS word;
    based at least in part on receiving the first text segment, retrieving, using the processor, the second text segment from a database;
    wherein the second text segment comprises a second text segment (STS) sequence comprising at least one STS character grouped into at least one STS word;
    converting, using the processor, the FTS sequence to a FTS sequence representation;
    converting, using the processor, the at least one FTS word to at least one FTS word representation;
    converting, using the processor, the STS sequence to a STS sequence representation;
    converting, using the processor, the at least one STS word to at least one STS word representation;
    extracting, using the processor, FTS sequence-level features from the FTS sequence representation;
    extracting, using the processor, FTS word-level features from the at least one FTS word representation;
    extracting, using the processor, STS sequence-level features from the STS sequence representation;
    extracting, using the processor, STS word-level features from the at least one STS word representation; and
    determining, using the processor, the level of similarity between the first text segment and the second text segment by applying a similarity metric technique to the FTS sequence-level features, the FTS word-level features, the STS sequence-level features, and the STS word-level features.

2. The computer-implemented method of claim 1, wherein:
    the STS sequence representation comprises a semantic STS sequence representation; and
    converting, using the processor, the STS sequence to the semantic STS sequence representation further comprises converting, using the processor, a first instance of the STS sequence to the semantic STS sequence representation.

3. The computer-implemented method of claim 2 further comprising:
converting, using the processor, a second instance of the STS sequence to a syntactic STS sequence representation; and
extracting, using the processor, STS syntactic-level features from the syntactic STS sequence representation.

4. The computer-implemented method of claim 3, wherein applying the similarity metric technique comprises also applying the similarity metric technique to the STS syntactic-level features.

5. The computer-implemented method of claim 1, wherein:
the first text segment comprises a segment of natural language text;
the second text segment comprises a segment of program code; and
the level of similarity between the segment of natural language text and the segment of program code comprises a measure of a likelihood that the natural language text describes a function of the segment of program code.

6. The computer-implemented method of claim 1 further comprising:
based at least in part on receiving the first text segment, retrieving, using the processor, a second instance of the second text segment from the database; and
performing, using the processor, a second task on the second instance of the second text segment;
wherein a result of the second task is a third text segment (TTS) representation of a third text segment; and
wherein applying the similarity metric technique comprises also applying the similarity metric technique to the TTS representation.

7. The computer-implemented method of claim 6 further comprising:
based at least in part on receiving the first text segment, performing, using the processor, a third task on a second instance of the first text segment;
wherein a result of the third task is a fourth text segment (4TS) representation of a fourth text segment; and
wherein applying the similarity metric technique comprises also applying the similarity metric technique to the 4TS representation.

8. The computer-implemented method of claim 7, wherein:
the first text segment comprises a first segment of natural language text;
the second text segment comprises a first segment of program code;
the third text segment comprises a second segment of natural language text;
the fourth text segment comprise a second segment of program code;
the level of similarity between the first segment of natural language text and the first segment of program code comprises a measure of a likelihood that the first segment of the natural language text describes a function of the first segment of program code;
the second task comprises translating the second instance of the first segment of program code to the second segment of natural language text; and
the third task comprises translating the second instance of the first segment of natural language text to the second segment of program code.

9. A system comprising a memory communicatively coupled to a processor that implements a neural network model configured to execute a first task comprising determining a level of similarity between a first text segment and a second text segment, the processor configured to execute operations comprising:
receiving a query comprising the first text segment;
wherein the first text segment comprises a first text segment (FTS) sequence comprising at least one FTS character grouped into at least one FTS word;
based at least in part on receiving the first text segment, retrieving the second text segment from a database;
wherein the second text segment comprises a second text segment (STS) sequence comprising at least one STS character grouped into at least one STS word;
converting the FTS sequence to a FTS sequence representation;
converting the at least one FTS word to at least one FTS word representation;
converting the STS sequence to a STS sequence representation;
converting the at least one STS word to at least one STS word representation;
extracting FTS sequence-level features from the FTS sequence representation;
extracting FTS word-level features from the at least one FTS word representation;
extracting STS sequence-level features from the STS sequence representation;
extracting STS word-level features from the at least one STS word representation; and
determining the level of similarity between the first text segment and the second text segment by applying a similarity metric technique to the FTS sequence-level features, the FTS word-level features, the STS sequence-level features, and the STS word-level features.

10. The system of claim 9, wherein:
the STS sequence representation comprises a semantic STS sequence representation; and
converting the STS sequence to the semantic STS sequence representation further comprises converting a first instance of the STS sequence to the semantic STS sequence representation.

11. The system of claim 10 further comprising:
converting a second instance of the STS sequence to a syntactic STS sequence representation; and
extracting STS syntactic-level features from the syntactic STS sequence representation.

12. The system of claim 11, wherein applying the similarity metric technique comprises also applying the similarity metric technique to the STS syntactic-level features.

13. The system of claim 9, wherein:
the first text segment comprises a segment of natural language text;
the second text segment comprises a segment of program code; and
the level of similarity between the segment of natural language text and the segment of program code comprises a measure of a likelihood that the natural language text describes a function of the segment of program code.

14. The system of claim 9 further comprising:
based at least in part on receiving the first text segment, retrieving a second instance of the second text segment from the database; and
performing a second task on the second instance of the second text segment;
wherein a result of the second task is a third text segment (TTS) representation of a third text segment; and
wherein applying the similarity metric technique comprises also applying the similarity metric technique to the TTS representation.

15. The system of claim 14 further comprising:
based at least in part on receiving the first text segment, performing a third task on a second instance of the first text segment;
wherein a result of the third task is a fourth text segment (4TS) representation of a fourth text segment; and
wherein applying the similarity metric technique comprises also applying the similarity metric technique to the 4TS representation.

16. The system of claim 15, wherein: the first text segment comprises a first segment of natural language text; the second text segment comprises a first segment of program code; the third text segment comprises a second segment of natural language text; the fourth text segment comprise a second segment of program code; the level of similarity between the first segment of natural language text and the first segment of program code comprises a measure of a likelihood that the first segment of the natural language text describes a function of the first segment of program code; the second task comprises translating the second instance of the first segment of program code to the second segment of natural language text; and the third stack comprises translating the second instance of the first segment of natural language text to the second segment of program code.

17. A computer program product for implementing a neural network model configured to execute a first task comprising determining a level of similarity between a first text segment and a second text segment, the computer program product comprising a computer readable storage medium having program instructions embodied therewith, the program instructions executable by a processor system to cause the processor system to perform operations comprising:
receiving a query comprising the first text segment;
wherein the first text segment comprises a first text segment (FTS) sequence comprising at least one FTS character grouped into at least one FTS word;
based at least in part on receiving the first text segment, retrieving the second text segment from a database;
wherein the second text segment comprises a second text segment (STS) sequence comprising at least one STS character grouped into at least one STS word;
converting the FTS sequence to a FTS sequence representation;
converting the at least one FTS word to at least one FTS word representation;
converting the STS sequence to a STS sequence representation;
converting the at least one STS word to at least one STS word representation;
extracting FTS sequence-level features from the FTS sequence representation;
extracting FTS word-level features from the at least one FTS word representation;
extracting STS sequence-level features from the STS sequence representation;
extracting STS word-level features from the at least one STS word representation; and
determining the level of similarity between the first text segment and the second text segment by applying a similarity metric technique to the FTS sequence-level features, the FTS word-level features, the STS sequence-level features, and the STS word-level features.

18. The computer program product of claim 17, wherein:
the STS sequence representation comprises a semantic STS sequence representation;
converting the STS sequence to the semantic STS sequence representation further comprises converting a first instance of the STS sequence to the semantic STS sequence representation;
the operations performed by the processor system further comprise:
converting a second instance of the STS sequence to a syntactic STS sequence representation; and
extracting STS syntactic-level features from the syntactic STS sequence representation; and
applying the similarity metric technique comprises also applying the similarity metric technique to the STS syntactic-level features.

19. The computer program product of claim 17, wherein:
the first text segment comprises a segment of natural language text;
the second text segment comprises a segment of program code; and
the level of similarity between the segment of natural language text and the segment of program code comprises a measure of a likelihood that the natural language text describes a function of the segment of program code.

20. The computer program product of claim 17, wherein the operations performed by the processor system further comprise:
based at least in part on receiving the first text segment, retrieving a second instance of the second text segment from the database;
performing a second task on the second instance of the second text segment;
wherein a result of the second task is a third text segment (TTS) representation of a third text segment;
wherein applying the similarity metric technique comprises also applying the similarity metric technique to the TTS representation; and
based at least in part on receiving the first text segment, performing a third task on a second instance of the first text segment;
wherein a result of the third task is a fourth text segment (4TS) representation of a fourth text segment;
wherein applying the similarity metric technique comprises also applying the similarity metric technique to the 4TS representation;
wherein the first text segment comprises a first segment of natural language text;
wherein the second text segment comprises a first segment of program code;
wherein the third text segment comprises a second segment of natural language text;
wherein the fourth text segment comprise a second segment of program code;
wherein the level of similarity between the first segment of natural language text and the first segment of program code comprises a measure of a likelihood that the first segment of the natural language text describes a function of the first segment of program code;
wherein the second task comprises translating the second instance of the first segment of program code to the second segment of natural language text; and
wherein the third stack comprises translating the second instance of the first segment of natural language text to the second segment of program code.

* * * * *